United States Patent [19]

Hata et al.

[11] Patent Number: 5,972,447

[45] Date of Patent: Oct. 26, 1999

[54] THERMOFORMABLE MULTILAYER FILM AND THERMOFORMED CONTAINER

[75] Inventors: Nobihiro Hata; Hiroyuki Shimo, both of Kurashiki, Japan

[73] Assignee: Kuraray Co., Ltd., Kurashiki, Japan

[21] Appl. No.: 08/927,266

[22] Filed: Sep. 11, 1997

[30] Foreign Application Priority Data

Sep. 30, 1996 [JP] Japan .................................. 8-259754
Feb. 17, 1997 [JP] Japan .................................. 9-031559

[51] Int. Cl.$^6$ .............................. B32B 27/30; B32B 1/02; B65D 1/22
[52] U.S. Cl. ..................... 428/35.7; 428/36.6; 428/36.7; 428/213; 428/215; 428/476.3; 428/518; 525/57
[58] Field of Search .................................. 428/35.7, 36.6, 428/36.7, 213, 215, 216, 327, 334, 335, 336, 476.3, 518; 525/57; 264/171.11, 171.12, 171.23

[56] References Cited

U.S. PATENT DOCUMENTS

| | | | |
|---|---|---|---|
| 4,079,850 | 3/1978 | Suzuki et al. .............................. | 215/1 |
| 4,135,026 | 1/1979 | Hoyt et al. .............................. | 428/220 |
| 4,281,045 | 7/1981 | Sumi et al. .............................. | 428/516 |
| 4,645,695 | 2/1987 | Negi et al. .............................. | 428/35 |
| 5,034,281 | 7/1991 | Kawasaki et al. ...................... | 428/522 |
| 5,082,743 | 1/1992 | Itamura et al. .......................... | 428/520 |
| 5,319,022 | 6/1994 | Fukada et al. ............................. | 525/57 |
| 5,399,619 | 3/1995 | Torradas et al. ........................... | 525/57 |
| 5,534,351 | 7/1996 | Pearson et al. .......................... | 428/516 |
| 5,700,412 | 12/1997 | Mehra et al. .......................... | 264/143 |

FOREIGN PATENT DOCUMENTS

| | | |
|---|---|---|
| 0 148 157 | 7/1985 | European Pat. Off. . |
| 0 370 361 | 5/1990 | European Pat. Off. . |
| 32 33 693 | 3/1984 | Germany . |
| WO 90/12061 | 10/1990 | WIPO . |

*Primary Examiner*—Ellis Robinson
*Assistant Examiner*—Sandra M. Nolan
*Attorney, Agent, or Firm*—Oblon, Spivak, McClelland, Maier & Neustadt, P.C.

[57] ABSTRACT

Disclosed herein is a thermoformable film or sheet superior in gas barrier properties, mechanical properties, and appearance, a thermoformed container produced therefrom, and a resin composition suitable therefor.

A thermoformable multilayer film with a total thickness of 50–300 $\mu$m, comprising a layer of a resin composition with a thickness of 3–50 $\mu$m, said resin composition comprising 60–99 wt % of ethylene-vinyl alcohol copolymer and 40–1 wt % of ethylene-(meth)acrylic acid copolymer, said ethylene-(meth)acrylic acid copolymer being dispersed in the form of particles in the matrix of said ethylene-vinyl alcohol copolymer, wherein said ethylene-vinyl alcohol copolymer having an ethylene content of 20–60 mol % and a degree of hydrolysis of not less than than 90%, and said ethylene-(meth)acrylic acid copolymer containing 1–30 wt % of (meth)acrylic acid.

The EVOH may be a mixture of more than one kind of EVOH differing in ethylene content. The resin composition may contain each component dispersed in a specific manner.

47 Claims, No Drawings

THERMOFORMABLE MULTILAYER FILM AND THERMOFORMED CONTAINER

BACKGROUND OF THE INVENTION

1. Field of the Invention

The present invention relates to a thermoformable multilayer film or sheet superior in gas barrier properties, thermoformability, mechanical properties, and appearance, to a thermoformed container produced therefrom, and to a resin composition for production thereof.

2. Description of the Related Art

Ethylene-vinyl alcohol copolymer (EVOH) is used as a good packaging material for foods and medicines whose quality retention is important. Packaging containers using EVOH are available in various types. One of the most common examples among them are thermoformed containers produced from multilayer films or sheets having an EVOH layers. Such film or sheet is also used for packaging without thermoforming.

The conventional packaging technology of thermoformed containers made from films has been developed to keep lean meat, processed meat, ham, sausage, etc. in good quality until their consumption. This object is achieved by keeping them away from oxygen during their storage, because oxygen deteriorates their quality. One package design for this end is to place contents in a pouch made of laminated film comprising biaxially-oriented layers having improved strength and barrier properties or to tightly enclose contents in oriented film by means of the heat shrink technology.

Another package design which has prevailed recently is an air-assisted or plug-assisted thermoformed film container with its top sealed with film. The advantage of this package design is that contents fit the container and are readily visible to consumers. In addition, it permits a label to be pasted to any desired position. (This is convenient for sales conforming to the recently enforced PL law.) Moreover, such containers are easy to display on the shelf if they are of uniform shape.

The multilayer film suitable for such thermoformed containers having low oxygen permeability is made from polyvinylidene chloride, for instance. Containing halogen, this plastic is not desirable from the standpoint of environmental protection for the use of packaging material. Another example of the multilayer film is one which has a nylon layer for good oxygen barrier properties and thermoformability. Nevertheless, it is still required to improve the oxygen barrier properties in order to meet consumers' demand for extended storage life.

EVOH is known as a material which has good oxygen barrier properties and causes environmental problems only slightly. However, it is liable to extreme thinning at corners and streaking and wrinkling at the time of thermoforming. These defects lead to a decrease in impact resistance. In addition, EVOH film tends to burst or give dull corners (due to lack of close contact with the mold) during thermoforming. This problem is more serious in the case of thin laminate film than in the case of thick laminate sheet.

Although no concrete means has been reported to address the above-mentioned problem involved in thermoforming, there are some analogous ones which resort to lamination of the EVOH layer with nylon or blending of EVOH with polyolefin and thermoplastic polymer containing carbonyl groups (as reported in U.S. Pat. No. 4,079,850). However, combination of EVOH and nylon or other polymers has an adverse effect on gas barrier properties, thermal stability (during film production), and clarity (depending on the dispersion of the resin blended).

A conventional application of comparatively thick sheet having an EVOH layer is to thermoformed containers for food packaging. Nowadays foods are sold in containers (such as cups and trays) which permit consumers to enjoy foods without dishing them up after purchase. Typical examples are containers for jelly, custard pudding, yogurt, and juice. Some of such containers are designed for storage by consumers without the necessity of transferring contents into ordinary containers after purchase (such as cups for miso).

Thermoformed containers for such food packaging as mentioned above need good form stability and oxygen barrier properties so that they keep contents in good quality. The first object is achieved by using polypropylene (or propylene homopolymer) which has balanced stiffness and impact strength. The second object is achieved by using a barrier layer of EVOH (to protect contents from deterioration by oxidation).

When made from a laminate sheet consisting of inner and outer layers of polypropylene and an intermediate layer of EVOH, the resulting thermoformed container would be poor in clarity (making contents less visible) and also poor in impact resistance as a whole (because of the propylene and EVOH layers lacking impact resistance). Moreover, it would have cracks or wavy patterns on its side walls (and hence look poor) because of EVOH's poor thermoformability. In order to improve thermoformability and impact resistance, there have been proposed several methods, including incorporation of nylon into EVOH. However, they still involve problems with unsatisfactory thermoformability, insufficient gas barrier properties, low thermal stability (at the time of sheet production), and decreased clarity (due to incomplete resin dispersion).

The recent widening application area requires thermoformed containers to have good clarity (for contents visibility) and good impact resistance (against dropping) and also to have an intricate shape (formed by deep drawing). A conceivable way to improve clarity is to make the inner and outer layers from propylene random copolymer, which has good clarity. A conceivable way to improve impact resistance is to make the inner and outer layers from propylene block copolymer, which has good impact resistance. Unfortunately, both propylene copolymers have a lower thermoforming temperature than propylene homopolymer, and EVOH (for the barrier layer) is poor in thermoformability at such a temperature (resulting in cracking and wavy patterns).

On the other hand, containers for custard pudding and jelly are made from polystyrene, which is superior in form retention and gloss. For some kinds of contents (such as fruit jelly) which need flavor retention, thermoformed containers made from a polystyrene-EVOH laminate are used. This laminate is poor in thermoformability as in the case of the above-mentioned propylene copolymer because polystyrene has a lower thermoforming temperature than propylene homopolymer.

OBJECT AND SUMMARY OF THE INVENTION

It is an object of the present invention to provide a thermoformable film and sheet superior in gas barrier properties, thermoformability, mechanical properties, and appearance, a thermoformed container made therefrom, and a resin composition for their production.

The thermoformable multilayer film of the present invention has a layer of a resin composition with a thickness of 3–50 μm, said resin composition comprising 60–99 wt % of EVOH and 40–1 wt % of ethylene-(meth)acrylic acid copolymer, said ethylene-(meth)acrylic acid copolymer being dispersed in the form of particles in the matrix of said EVOH, wherein said EVOH having an ethylene content of 20–60 mol % and a degree of hydrolysis of not less than than 90%, and said ethylene-(meth)acrylic acid copolymer containing 1–30 wt % of (meth)acrylic acid.

In a preferred embodiment of the thermoformable multilayer film, the EVOH comprises two kinds of EVOH (a) and (b) in a ratio (a/b) of from 2/1 to 50/1 by weight, wherein the ethylene content of (a) is 20–45 mol % and the ethylene content of (b) is 45–65 mol %, with the difference between their ethylene contents being not less than 8 mol %.

In another preferred embodiment of the thermoformable multilayer film, the EVOH has a value (A) of MI and the ethylene-(meth) acrylic acid copolymer has a value (B) of MI such that the ratio of A/B is 0.1–5.0.

In another preferred embodiment of the thermoformable multilayer film, the ethylene-(meth)acrylic acid copolymer is dispersed in the form of particles in the EVOH matrix such that the particles are cylindrically elongated in one direction parallel to the film surface, with their cross-section perpendicular to that direction having an average diameter of 0.2–1.3 μm.

According to a preferred embodiment, the thermoformable multilayer film is provided with a resin composition layer and a heat-seal layer (and an additional polypropylene resin layer and/or polyamide resin layer). The thermoformed multilayer film has a haze 10% or lower in its preferred embodiment.

The present invention also covers a thermoformed container made from the above-mentioned multilayer film. The thermoformed container satisfies following equations, $$5S \leq T/t \leq 30S \quad (1)$$

$$50 \leq T \leq 300 \quad (2)$$

$$t \leq 20 \quad (3)$$

where T stands for the total wall thickness (in μm) of the thickest part of the container, t stands for the total wall thickness (in μm) of the thinnest part of the container, and S stands for the draw ratio of the container which is defined as the ratio of the depth of the container to the diameter of a circle inscribed in the opening of the container.

In a preferred embodiment of the thermoformed container, the ethylene-(meth)acrylic acid copolymer is dispersed in the form of particles in the EVOH matrix in the thinnest part of the container wall such that the particles are elongated flat in two directions parallel to the film surface, with their cross-section perpendicular to the film surface having an average thickness of 0.05–1.0 μm.

The present invention covers a thermoformable multilayer structure including a layer of a resin composition comprising 60–99 wt % of EVOH and 40–1 wt % of ethylene-(meth)acrylic acid copolymer, said ethylene-(meth)acrylic acid copolymer being dispersed in the form of particles in the matrix of said EVOH, wherein said EVOH having an ethylene content of 20–60 mol % and a degree of hydrolysis of not less than than 90%, and said ethylene-(meth)acrylic acid copolymer containing 1–30 wt % of (meth)acrylic acid.

In a preferred embodiment of the thermoformable multilayer structure, the EVOH comprises two kinds of EVOH (a) and (b) in a ratio (a/b) of from 2/1 to 50/1 by weight, wherein the ethylene content of (a) is 20–45 mol % and the ethylene content of (b) is 45–65 mol %, with the difference between their ethylene contents being not less than 8 mol %.

In another preferred embodiment of the thermoformable multilayer structure, the ethylene-(meth)acrylic acid copolymer is dispersed in the form of particles in the EVOH matrix such that the particles are cylindrically elongated in one direction parallel to the surface of the multilayer structure, with their cross-section perpendicular to that direction having an average diameter of 0.2–1.3 μm.

The thermoformable multilayer structure may include a layer of propylene copolymer having a Vicat softening point of 100–152° C. The propylene copolymer may be a random or block copolymer. The thermoformable multilayer structure may include a layer of styrene polymer. The thermoformable multilayer structure may have a haze 50% or lower.

The present invention also covers a thermoformed container made from the above-mentioned multilayer structure. The thermoformed container satisfies following equations, $$S \leq T/t \leq 20S \quad (5)$$

$$300 < T \leq 3000 \quad (6)$$

$$t \leq 100 \quad (7)$$

where T stands for the total wall thickness (in μm) of the thickest part of the container, t stands for the total wall thickness (in μm) of the thinnest part of the container, and S stands for the draw ratio of the container which is defined as the ratio of the depth of the container to the diameter of a circle inscribed in the opening of the container.

The present invention covers a resin composition which comprises 60–99 wt % of EVOH and 40–1 wt % of ethylene-(meth)acrylic acid copolymer, said ethylene-(meth)acrylic acid copolymer being dispersed in the form of particles in the matrix of said EVOH, wherein said EVOH having an ethylene content of 20–60 molt and a degree of hydrolysis of not less than than 90%, and said ethylene-(meth)acrylic acid copolymer containing 1–30 wt % of (meth)acrylic acid.

In a preferred embodiment of the resin composition, the EVOH is a mixture of two kinds of EVOH (a) and (b) in a ratio (a/b) of from 2/1 to 50/1 by weight, wherein the ethylene content of (a) is 20–45 mol % and the ethylene content of (b) is 45–65 mol %, with the difference between their ethylene contents being not less than 8 mol %.

In another preferred embodiment of the resin composition, the ethylene-(meth)acrylic acid copolymer is dispersed in the form of particles in the EVOH matrix such that the particles have an average particle diameter of 0.3–1.5 μm.

DESCRIPTION OF THE PREFERRED EMBODIMENTS

The EVOH in the present invention is obtained by alkali-catalyzed hydrolysis of an ethylene-vinyl ester copolymer.

The vinyl ester includes vinyl acetate (typically) and other aliphatic vinyl esters such as vinyl propionate and vinyl pivalate.

The EVOH in the present invention should have an ethylene content of 20–60 mol %, preferably 25–50 mol %, more preferably 25–45 mol %. In the case where the EVOH comprises two or more kinds of EVOH differing in ethylene content, an average ethylene content should be calculated from their mixing ratio by weight.

With an ethylene content lower than 20 mol %, the resulting EVOH is poor in gas barrier properties under high humidity and is also poor in melt-formability. With an ethylene content more than 60 mol %, the resulting EVOH does not provide satisfactory gas barrier properties.

The EVOH in the present invention should have a degree of hydrolysis (of vinyl ester) 90% or higher, preferably 95% or higher, and more preferably 98% or higher. In the case where the EVOH comprises two or more kinds of EVOH differing in degree of hydrolysis, an average degree of hydrolysis should be calculated from their mixing ratio by weight.

With a degree of hydrolysis lower than 90 mol %, the resulting EVOH is poor in gas barrier properties under high humidity and is also poor in thermal stability (leading to the occurrence of gel in the formed articles).

The EVOH in the present invention may be copolymerized with additional monomers in an amount not harmful to the object of the present invention. Examples of such comonomers include α-olefins (such as propylene, butene, isobutene, 4-methylpentene-1, hexene, and octene); unsaturated carboxylic acids (such as itaconic acid, methacrylic acid, acrylic acid, and maleic anhydride) and their salts, partial or total esters, nitriles, amides, and anhydrides; vinylsilane compounds (such as vinyltrimethoxysilane), unsaturated sulfonic acid and salts thereof, alkylthiols, and vinylpyrrolidone.

Of these comonomers, vinylsilane compounds are desirable because when incorporated in an amount of 0.0002–0.2 mol % they improve EVOH in its compatibility with the molten base resin for coextrusion. This leads to the production of a uniform multilayer film by coextrusion and also contributes to the improved dispersion and moldability in the case where two or more kinds of EVOH are blended together. Preferred examples of the vinylsilane compound include vinyltrimethoxysilane, vinyltriethoxysilane, vinyltri (β-methoxyethoxy)silane, and γ-methacryloxypropylmethoxysilane. Of these examples, the first two are particularly desirable.

The EVOH in the present invention should contain phosphorus compounds in an amount of 1–200 ppm, preferably 2–150 ppm, more preferably 5–100 ppm (in terms of phosphorus element) for good film-forming properties and thermal stability.

The EVOH in the present invention may contain alkali metal ions (such as sodium ions, potassium ions, and lithium ions) in an amount of 10–500 ppm (in terms of metal based on EVOH). These metal ions enhance the effect of the present invention and improves the adhesion between layers and compatibility. Examples of the alkali metal compounds include monovalent metal salts of aliphatic carboxylic acids, aromatic carboxylic acids, and phosphoric acid, and metal complexes. Typical examples are sodium acetate, potassium acetate, sodium phosphate, lithium phosphate, sodium stearate, potassium stearate, and sodium ethylenediaminetetraacetate. Of these examples, the first three are particularly desirable.

The EVOH in the present invention should have a melt index (MI) of 0.1–50 g/10 min, preferably 0.5–20 g/10 min (measured at 210° C. under a load of 2160 g). In the case where the EVOH comprises two or more kinds of EVOH differing in melt index, an average melt index should be calculated from their mixing ratio by weight.

The EVOH in the present invention should preferably be a mixture of two or more kinds of EVOH differing in ethylene content and/or degree of hydrolysis.

It is especially desirable to use a mixture of two kinds of EVOH (a) and (b) in a ratio (a/b) of from 2/1 to 50/1 by weight, wherein the ethylene content of (a) is 20–45 mol % and the ethylene content of (b) is 45–65 mol %, with the difference between their ethylene contents being not less than 8 mol %. Such a mixture contributes to good gas barrier properties and thermoformability.

EVOH (a) should have an ethylene content of 20–45 mol %, preferably 25–42 mol %, and more preferably 30–40 mol %. EVOH (a) having an ethylene content of less than 20 mol % has an adverse effect on thermoformability. EVOH (a) having an ethylene content of more than 45 mol % has an adverse effect on gas barrier properties.

EVOH (b) should have an ethylene content of 45–65 mol %, preferably 47–62 mol %, and more preferably 50–60 mol %. EVOH (b) meeting these requirements contributes to thermoformability.

EVOH (a) and EVOH (b) should differ in ethylene content such that the difference is more than 8 mol %, preferably more than 12 mol %, and more preferably more than 15 mol %. If this difference is less than 8 mol %, the resulting mixture of EVOH (a) and (b) does not contribute to improvement in thermoformability.

EVOH (a) and EVOH (b) should be used in such amounts that the mixing ratio a/b by weight is in the range of 2/1 to 50/1, preferably 3/1 to 40/1, and more preferably 4/1 to 30/1. With a mixing ratio lower than 2/1, the resulting EVOH mixture is poor in gas barrier properties. With a mixing ratio higher than 50/1, the resulting EVOH mixture does not contribute to improvement in thermoformability.

The present invention employs an ethylene-(meth)acrylic acid copolymer which is formed from ethylene (as the major component) and acrylic acid or methacrylic acid by copolymerization. This copolymer does not include so-called ionomer in which the carboxylic acid in the copolymer forms a salt with metal (such as sodium and zinc). Ionomer does not achieve the object of the present invention as shown in Comparative Example given later (although the reason is not fully understood).

The ethylene-(meth)acrylic acid copolymer should contain (meth)acrylic acid in an amount of 1–30 wt %, preferably 2–25 wt %, more preferably 3–20 wt %. The one with an amount less than 1 wt % is poor in particle dispersion. The one with an amount more than 30 wt % is poor in thermal stability.

The ethylene-(meth)acrylic acid copolymer in the present invention should have a melt index (MI) of 0.1–80 g/10 min, preferably 0.5–50 g/10 min (measured at 210° C. under a load of 2160 g). It is possible to use by blending two or more kinds of the copolymers differing in (meth)acrylic acid content and/or melt index.

The resin composition of the present invention should contain EVOH in an amount of 60–99 wt %, preferably 70–97 wt %, more preferably 80–95 wt %, and also contain ethylene-(meth)acrylic acid copolymer in an amount of 1–40 wt %, preferably 3–30 wt %, and more preferably 5–20 wt %.

If the amount of the ethylene-(meth)acrylic acid copolymer is less than 1 wt %, the resulting resin composition is poor in thermoformability, with the result that the molded article has thin wall at corners and side-bottom intersections and also has a low impact resistance. If the amount of the ethylene-(meth)-acrylic acid copolymer is more than 40 wt %, the resulting resin composition is extremely poor in gas barrier properties and the thermoformed container suffers such a great molding shrinkage that it is of no practical use.

The resin composition of the present invention is that the ethylene-(meth)acrylic acid copolymer is dispersed in the form of particles in the EVOH matrix. This dispersion contributes to good gas barrier properties, thermoformability, and mechanical properties. The resin composition would be very poor in gas barrier properties if EVOH is dispersed in the matrix of the ethylene-(meth) acrylic acid copolymer or both polymers are simply intermingled with each other.

According to the present invention, the EVOH should have a value (A) of MI and the ethylene-(meth)acrylic acid copolymer should have a value (B) of MI such that the ratio of A/B is 0.1–5.0, preferably 0.15–3.0, and more preferably 0.2–2.0. (MI is measured at 210° C. under a load of 2160 g.) The combination of two polymers having MI values in a specific range contributes to good particle distribution and to achieving the object of the present invention.

The resin composition of the present invention may be incorporated with one or more kinds of additives, such as hydrotalcite, hindered phenol, hindered amine, and metal salt of higher aliphatic carboxylic acid (e.g., calcium stearate and magnesium stearate), in an amount of 0.01–1 wt % of the resin composition for improvement in melt stability and enhancement of the effect of the present invention.

The resin composition of the present invention may optionally be incorporated with a variety of additives, such as antioxidant, plasticizer, heat stabilizer, UV light absorber, antistatic agent, slip agent, colorant, filler, and polymeric compound, in an amount not harmful to the effect of the present invention. Examples of the additives are given below.

Antioxidant: 2,5-di-t-butylhydroquinone, 2,6-di-t-butyl-p-cresol, 4,4'-thiobis(6-t-butylphenol), 2,2'-methylene-bis-(4-methyl-6-t-butylphenol), 2,2'-methylene-bis-(4-methyl-6-t-butylphenol), octadecyl-3-(3',5'-di-t-butyl-4'-hydroxyphenyl)-propionate, 4,4'-thiobis-(6-t-butylphenol), etc.

UV light absorber: ethylene-2-cyano-3,3'-diphenyl acrylate, 2-(2'-hydroxy-5'-methylphenyl)benzotriazole, 2-(2'-hydroxy-5'-methylphenyl)benzotriazole, 2-(2'-hydroxy-5'-methylphenyl)-benzotriazole, 2-hydroxy-4-methoxybenzohenone, 2,2'-dihydroxy-4-methoxybenzophenone, etc.

Plasticizer: dimethyl phthalate, diethyl phthalate, dioctyl phthalate, wax, fluid paraffin, phosphate ester, etc.

Antistatic agent: pentaerithrytol monostearate, sorbitan monopalmitate, sulfated polyolefin, polyethylene oxide, carbo-wax, etc.

Slip agent: ethylene bis-stearamide, butyl stearate, etc.

Colorant: carbon black, phthalocyanine, quinacridone, indoline, azoic pigment, red iron oxide, etc.

Filler: glass fiber, asbestos, wollastonite, calcium silicate, etc.

The resin composition may also be incorporated with many other polymeric compounds in amounts not harmful to the effect of the present invention.

The resin composition of the present invention should preferably contain in the EVOH matrix the ethylene-(meth) acrylic acid copolymer dispersed in the form of particles having an average diameter of 0.3–1.5 μm, more preferably 0.3–1.0 μm. Such particles contribute to good gas barrier properties, thermoformability, mechanical properties, and clarity. With an average diameter greater than 1.5 μm, particles tend to disperse unevenly, producing an adverse effect on thermoformability and gas barrier properties. With an average diameter smaller than 0.3 μm, particles do not contribute to thermoformability.

The state of particle dispersion can be known by observing pellets from which film or sheet is made. Observation may be accomplished by the aid of a scanning electron microscope (for cut surface) or a transmission electron microscope (for sections). The resulting electron micrograph undergoes image processing to determine the contour of particles from which the average major and minor axes are calculated. To ensure accurate measurements, observations are carried out in three mutually perpendicular directions for the same sample.

The particle dispersion specified above preferably achieved by adopting special mixing operations by a continuous mixer (such as intensive mixer and kneading type twin-screw extruder running in the same direction or opposite direction) or a batch-wise mixer (such as Banbury mixer, intensive mixer, and pressure kneader). Additional examples of mixers include disc attritor, KCK mixing-extruder (made by KCK Co., Ltd.). single-screw extruder equipped with a mixing unit (e.g., Dalmage and CTM), and Brabender (as a simple mixer).

Of the mixers mentioned above, continuous intensive mixers are most desirable for the object of the present invention. They are commercially available from Farrel (FCM), The Japan Steel Works, Ltd. (CIM), and Kobe Steel, Ltd.(KCM, LCM, ACM). In actual operation, the intensive mixer should be combined with a single-screw extruder so that mixing and pelletizing are accomplished simultaneously. Another example of the mixer is a twin-screw extruder equipped with a kneading disc or mixing rotor, which is commercially available from The Japan Steel Works, Ltd. (TEX), Werner & Pfleiderer (ZKS), Toshiba Machine Co., Ltd. (TEM), and Ikegai Corporation (PCM).

The continuous mixer should preferably have an adequately designed rotor or disc for satisfactory mixing. The clearance between the mixing chamber and the rotor tip or disc tip is of crucial importance. It should preferably be 1–5 mm.

In order to achieve the desired particle dispersion, it is preferable to run the mixer with a specific energy higher than 0.1 kWh/kg, more preferably 0.2–0.8 kWh/kg.

The specific energy is expressed in terms of quotient of division of energy (electric power consumed, kW) by the amount of material (kg) processed per hour. Its unit is kWh/kg. In order to obtain the resin composition of the present invention, it is preferable to perform mixing with a higher specific energy than that for usual mixing. A specific energy higher than 0.1 kWh/kg cannot be attained simply by increasing the rotary speed of the mixer; it is preferable to lower the temperature of the melt, thereby increasing the viscosity of the melt, by means of jacket cooling. Mixing at a low viscosity is not preferable to provide the desired resin composition. A desirable mixing temperature is such that the stock temperature at the exit of the mixing section is in the range of the melting point of EVOH to the melting point of EVOH plus 40° C.

The mixer should be run such that the rotary speed of the rotor is 100–1200 rpm, preferably 150–1000 rpm, and more preferably 200–800 rpm. The mixing chamber should have an inside diameter larger than 30 mm, preferably 50–400 mm. In addition, the mixing chamber should preferably have an L/D ratio (length to diameter) in the range of 4–30. Mixers may be used singly or in tandem.

The mixing time should be 10–600 seconds, preferably 15–200 seconds, and most desirably 15–150 seconds. Excessively long mixing causes thermal deterioration to EVOH and is uneconomical.

The resin composition obtained as mentioned above is used for the thermoformable multilayer structure.

Thermoforming in the present invention is a process for heating and softening a film or sheet stock and then causing it to conform to a metal mold by vacuum or compressed air, if necessary, in combination with a plug. This forming process is classified variously into straight forming, drape forming, air slip forming, snap back forming, and plug-assist forming. Forming conditions such as temperature, vacuum, pressure, and speed depend on the configuration of metal mold and plug and the properties of film or sheet stock.

The forming temperature is not specifically restricted so long as it is high enough for the resin to become soft for forming. It depends on the film or sheet stock used.

In the case of film stock, the forming temperature should not be such that the wavy pattern of the metal surface of the heater is transferred to the film (due to excessively high temperature) or forming is incomplete (due to excessively low temperature). To be specific, the film temperature should be 50–120° C., preferably 60–110° C., more particularly 70–100° C.

In the case of sheet stock (which is thicker than film), thermoforming may be accomplished at 130–180° C., which is higher than that for film stock.

The thermoformed container according to the present invention is a container which is formed by making a hollow on flat film or sheet stock. The configuration of the hollow accords with the shape of the contents. The deeper and more complex the hollow is, the more liable the ordinary EVOH laminate is to thickness variation and extreme thinning at corners. Thus the present invention produces its effect in such cases. In the case of thermoformed container made from film stock, the draw ratio (S) should preferably be 0.2 or grater, more preferably 0.3 or grater, and most preferably 0.4 or greater. In the case of thermoformed container made from sheet stock, the draw ratio (S) should be 0.3 or greater, preferably 0.5 or greater, and more preferably 0.8 or greater.

The draw ratio is defined as the ratio of the depth of the container to the diameter of a circle inscribed in the opening (hollow) of the container. If the opening is circular, the diameter of the inscribed circle equals the diameter of the opening. If the opening is elliptic, the diameter of the inscribe circle equals the minor axis of the ellipse. If the opening is rectangular, the diameter of the inscribed circle equals the short side of the rectangle.

Thermoforming of thin film stocks is more difficult than that of thick sheet stocks due to tendency toward corner breakage in the case of deep drawing. Desirable thermoforming is achieved with the film stock including the layer of the resin composition according to the present invention. In addition, the multilayer film of the present invention is suitable for containers which need good clarity that makes contents visible.

The thermoformable multilayer film of the present invention is a film comprising the layer of the above-mentioned resin composition which is capable of thermoforming. The thermoformable multilayer film should have a total thickness of 50–300 $\mu$m, preferably 80–250 $\mu$m, and the layer of the resin composition should have a thickness of 3–50 $\mu$m, preferably 5–40 $\mu$m. The one thicker than 300 $\mu$m in total is uneconomical, and the one thinner than 50 $\mu$m in total is undesirable because of tendency toward thinning and breakage at corners and pinholing in the layer of the resin composition. The layer of the resin composition will be uneconomical and poor in thermoformability if it is thicker than 50 $\mu$m. Conversely, it will be liable to pinholing (at the time of thermoforming) if it is 3 $\mu$m or thinner.

The thermoformable multilayer film is characterized in that the layer of the resin composition contains ethylene-(meth)-acrylic acid copolymer dispersed in the form of particles in the matrix of EVOH. Dispersion should preferably be such that particles are cylindrically elongated in one direction parallel to the film surface, with their cross-section perpendicular to that direction having an average diameter of 0.2–1.3 $\mu$m, more preferably 0.3–1.0 $\mu$m.

Particles having a cross-section whose average diameter is greater than 1.3 $\mu$m are liable to uneven dispersion in the composition, which leads to troubles in thermoforming and decrease in gas barrier properties. Conversely, particles having a cross-section whose average diameter is smaller than 0.2 $\mu$m do not contribute to thermoformability.

The average diameter of the particle cross-section can be measured as follows. A sample is prepared by cutting film in the direction perpendicular to the direction of extrusion, and the cut surface is observed under a scanning or transmission electron microscope. The resulting electron micrograph undergoes image processing to determine the contour of particles from which the average major and minor axes are calculated. Then the average diameter is obtained by averaging the measured values.

Although the thermoformable multilayer film is not specifically restricted in the layer construction, it is preferable that it have a heat-sealing layer which facilitates air-tight closing. In addition, it should preferably have a polyamide layer and/or polypropylene layer which contributes to the mechanical properties and thermoformability of the film. It is more preferable that the thermoformable multilayer film have both a heat-sealing layer and a polypropylene layer and/or polyamide layer. There may be an adhesive layer between these layers. There may be more than one each of these layers.

The resin for the heat-sealing layer is not specifically restricted. It should preferably have a melting point or softening point lower than the melting point of the EVOH used in the layer of the resin composition. A polyolefin resin is desirable. Examples of the polyolefin resin include olefin homopolymers (such as low-density polyethylene, polypropylene, and polybutene-1), copolymers of $\alpha$-olefins (selected from ethylene, propylene, 1-butene, 1-hexene, 1-octene, and 4-methyl-1-pentene), and copolymers of $\alpha$-olefin and other comonomers. Examples of such comonomers include vinyl compounds (such as diolefin, N-vinylcarbazole, vinyl chloride, vinylidene chloride, vinyl acetate, styrene, acrylonitrile, and vinyl ether), unsaturated carboxylic acids (such as maleic acid, acrylic acid, methacrylic acid, ethacrylic acid, fumaric acid, and itaconic acid), esters and anhydrides thereof, and adducts thereof with hydroxyl group or epoxy group. Some examples of the copolymer include grafted polyolefin copolymer and ionomer resins (which are a reaction product of an $\alpha$-olefin/$\alpha$, $\beta$-unsaturated carboxylic acid copolymer and an ionic metal compound). Of these examples, low-density polyethylene (LDPE) and linear low-density polyethylene (LLDPE) are desirable. These polyolefin resins may be used alone or in combination with one another.

The polyamide resin layer imparts good thermoformability to the multilayer film composed of only the resin composition layer and the heat-sealing layer. The polyamide resin for the polyamide resin layer is not specifically restricted. It includes homopolymers such as polycaproamide (nylon-6), polyundecaneamide (nylon-11), polylauryllactam (nylon-12), polyhexamethyleneadipamide (nylon-6, 6), and polyhexamethylenecebacamide (nylon-6,12) and copolymers such as caprolactam/lauryllactam copolymer (nylon-6/12), caprolactam/aminoundecanoic acid copolymer (nylon-6/11), caprolactam/$\omega$-aminonanoic acid copolymer (nylon-6/9), caprolactam/hexamethylenediammonium adipate copolymer (nylon-6/6,6), caprolactam/hexamethylenediammonium adipate/hexamethylenediammonium cebacate copolymer (nylon-6/6, 6/6,12). These polyamide resins may be used alone or in combination with one another. The thermoformable multi-layerfilm should preferably have both a heat sealing layer and a polyamide resin layer so that it easily provides air-tight sealing.

The polypropylene resin layer is not so effective as the polyamide resin layer in improving thermoformability; however, it is inexpensive and it offers the advantage of enhancing the moisture resistance and mechanical properties of the film. The polypropylene resin may be of isotactic or syndiotactic, or a copolymer with a small portion of comonomer. The thermoformable multilayer film having both a polypropylene resin layer and a heat-sealing layer is desirable because of its ability to readily seal contents.

The thermoformable film of the present invention should preferably have a haze 10% or lower. The one having a haze higher than 10% makes contents less visible when formed into packaging containers. Haze is measured according to the method provided by ASTM D1003-61.

The thermoformable multilayer film of the present invention may be constructed as illustrated in the following examples, in which EVOH denotes the EVOH composition, PA denotes the nylon layer, AD denotes the adhesive layer, PP denotes the polypropylene layer, and S denotes the heat-sealing layer.

PA/AD/EVOH/AD/S,           PP/AD/EVOH/AD/S,
EVOH/AD/PA/AD/S,           EVOH/AD/PP/AD/S,
PA/AD/EVOH/AD/PA/AD/S,     PP/AD/PA/AD/EVOH/AD/S,
PP/AD/PA/AD/EVOH/AD/PA/AD/S.

The layer construction shown above may be modified by adding layers of other resin such as polyester and polystyrene.

The thermoformable multilayer film of the present invention may be produced by any unrestricted method, such as those used for polyolefin. For example, T-die extrusion, blown-film extrusion, coextrusion, and dry lamination. Coextrusion is particularly desirable. Coextrusion may be combined with dry lamination. For example, a multilayer film of LLPE/AD/EVOH/AD/LLDPE formed by coextrusion may be given afterward a layer of PP or PA by dry lamination to give a multilayer film of PA/AD/LLDPE/AD/EVOH/AD/S.

According to the present invention, the thermoformed container should be made from the above-mentioned thermoformable multilayer film such that the following conditions are satisfied.

$$5S \leq T/t \leq 30S \quad (1)$$

$$50 \leq T \leq 300 \quad (2)$$

$$t \geq 20 \quad (3)$$

preferably $$6S \leq T/t \leq 20S \quad (1')$$

$$80 \leq T \leq 250 \quad (2')$$

$$t \geq 25 \quad (3')$$

more preferably $$7S \leq T/t \leq 15S \quad (1'')$$

$$90 \leq T \leq 200 \quad (2'')$$

$$t \geq 30 \quad (3'')$$

where T stands for the total wall thickness (in $\mu$m) of the thickest part of the container (corresponding to the film thickness before forming), t stands for the total wall thickness (in $\mu$m) of the thinnest part of the container, and S stands for the draw ratio of the container.

The value of T/t smaller than 5S implies that the container has a shape that can be thermoformed easily without requiring the film structure of the present invention. The value of T/t greater than 30S implies that the container greatly fluctuates in wall thickness. With T exceeding 300 $\mu$m, the resulting container would be heavier than necessary and hence uneconomical. With T smaller than 50 $\mu$m, the resulting container would be excessively thin at hollow part and poor in mechanical strength. The layer of the resin composition at such a thin part is liable to pinholing. The container having t smaller than 20 $\mu$m is not desirable for the same reason as above.

The thermoformed container produced from the above-mentioned thermoformable multilayer film is that each resin of the resin composition layer is dispersed in a specific manner in the thinnest part. That is, the ethylene-(meth)acrylic acid copolymer is dispersed in the form of particles in the matrix of EVOH such that the particles are elongated flat in two-dimensional directions parallel to the film surface. The dispersed particles have a cross-section perpendicular to the film surface which is characterized by an average thickness of 0.05–1.0 $\mu$m, preferably 0.06–0.5 $\mu$m. Particles having an average thickness smaller than 0.05 $\mu$m or larger than 1.0 $\mu$m will cause film breakage during thermoforming.

The average thickness of particles is measured in the following manner. First, the wall thickness of the container is measured at many points so as to find the thinnest part. A sample is cut from the thinnest part and the cut surface of the sample (perpendicular to the film surface) is observed under a scanning electron microscope or a thin section of the sample is observed under a transmission electron microscope. The resulting electron micrograph undergoes image processing to determine the contour of particles from which the average thickness is calculated.

The thermoformed containers produced from the above-mentioned film will be used in many application areas by virtue of good gas barrier properties (due to the resin composition of the present invention). They are suitable for packaging foods (especially meat), medicines, agricultural chemicals, and any other products which are deteriorated by oxygen.

The resin composition of the present invention may be used not only as thermoformable film but also as thermoformable sheet of multilayer construction (which is thicker than film). In its sheet form, too, it exhibits good gas barrier properties, thermoformability, mechanical properties, and clarity.

The multilayer structure is not specifically restricted. The layer of the resin composition may be laminated with a layer of such resin as polyolefin, polystyrene, polyamide, saturated polyester (polyethylene terephthalate), polycarbonate, polyvinyl chloride, and polyvinylidene chloride. Their selection depends on applications. The lamination layers provide better gas barrier properties under high humidity and higher strength than the single layer of the resin composition.

Preferred resins for lamination include polypropylene (PP), polystyrene (PS), and polyester (PES). Preferred examples of the layer construction are PP/AD/EVOH/AD/PP, PS/AD/EVOH/AD/PS, and PES/AD/EVOH/AD/PES. They may be modified as desired.

A layer construction for the maximum effect of the present invention is the combination of a layer of the above-mentioned resin composition and a layer of propylene copolymer which has a Vicat softening point of 100–152° C. This propylene copolymer is composed of propylene and a small amount of comonomer such as ethylene and $C_{4-8}$ α-olefin. Both random copolymer and block copolymer are acceptable, the former being superior in clarity and the latter being superior in impact resistance.

Examples of $C_{4-8}$ α-olefin as comonomer for the above-mentioned propylene copolymer includes 1-butene, isobutene, 1-pentene, 1-hexene, 1-heptene, 1-octene, 3-methyl-1-butene, 4-methyl-1-pentene and 4,4'-dimethyl-1-pentene. They may be used alone or in combination with one another. Of these examples, the first six are desirable because of their low price and ability to be copolymerized in a broad range of composition. Copolymerization with ethylene is also desirable for the same reason as above.

The content of the comonomer is not specifically restricted. In the case of random copolymer, it should be 10 wt % or less, preferably 1–7 wt %, for good clarity and stiffness. In the case of block copolymer, it should be 2–30 wt % for good impact resistance.

The above-mentioned propylene copolymer may be polymerized in any known manner which is not specifically restricted. Copolymerization may be accomplished with the aid of Ziegler catalyst or recently developed metallocene catalyst. The second catalyst gives rise to random copolymers superior in clarity. In addition, the propylene copolymer is not specifically restricted in melt index. For good formability, it should have a melt index of 0.01–20 g/10 min, preferably 0.1–10 g/10 min. Different kinds of propylene copolymers may be used in combination.

According to the present invention, the layer of the propylene copolymer should have a Vicat softening point (ASTM D1525) of 100–152° C. It preferably be 105° C. or higher, more preferably 110° C. or higher, and most desirably 115° C. or higher. It preferably be 150° C. or lower, more preferably 145° C. or lower, and most desirably 140° C. or lower. With a Vicat softening point higher than 152° C., the layer is poor in clarity (for random copolymer) or in impact resistance (for block copolymer). With a Vicat softening point lower than 100° C., the layer is poor in stiffness (and hence in keeping the shape of the container).

The layer of the propylene copolymer may be replaced by the one which is made of a composition comprising the propylene copolymer (as the major constituent) and other components. In other words, the propylene copolymer may be incorporated with any other resins so long as the resulting layer has a Vicat softening point in the range of 100–152° C.

For example, the propylene copolymer may be incorporated with propylene homopolymer. In this case, the resulting product has intermediate properties of propylene copolymer and propylene homopolymer, and the two components are miscible with each other. The layer may be made of recycled composition including EVOH, ethylene-(meth) acrylic acid copolymer, and adhesive resin.

The thermoformable multilayer structure of the present invention is not specifically restricted in layer construction except that it has the layer of the resin composition and the layer of the propylene copolymer as mentioned above. A preferred layer construction is such that the layer of the resin composition is sandwiched between layers of propylene copolymer, with an adhesive resin layer interposed between them.

Covering both sides of the layer of the resin composition with propylene copolymer prevents it from decreasing in gas barrier properties due to moisture absorption. In addition, adhesion between the two layers is ensured by the adhesive resin layer.

The resin for the adhesive resin layer is not specifically restricted. Its preferred examples include polyurethane-based or polyester-based one-pack or two-pack curable adhesive and olefin polymer or copolymer modified by copolymerization or grafting with an unsaturated carboxylic acid or anhydride thereof (such as maleic anhydride). The adhesive resin layer contributes to thermoformed containers superior in layer-to-layer adhesion.

A preferred adhesive resin is a carboxylic acid-modified polyolefin resin. It exhibits good adhesion to the layer of the resin composition including EVOH and to the propylene copolymer. In addition, it is compatible with other materials at the time of scrap recycling. It is obtained by modifying with a carboxylic acid polyethylene (LDPE, LLDPE, VLDPE), polypropylene, propylene copolymer, ethylene-vinyl acetate copolymer, or ethylene-methyl or ethyl (meth) acrylate ester copolymer.

The thermoformable multilayer structure of the present invention may have the layer construction as illustrated below.

coPP/AD/EVOH/AD/coPP,
coPP/AD/EVOH/AD/REG,
coPP/AD/EVOH/AD/REG/coPP (where EVOH stands for EVOH composition, coPP stands for propylene copolymer, AD stands for adhesive resin, and REG stands for recycled material.) The layer structure may have additional layers of polyethylene, polyamide, polyester, polystyrene, etc.

The thermoformable multilayer structure of the present invention should have a haze of 50% or lower. This object is easily achieved when a random copolymer is used as the propylene copolymer. With a haze of higher than 50%, the multilayer structure is not suitable for packaging containers because it makes contents less visible. Haze is measured according to ASTM D1003-61.

Instead of the layer of the propylene copolymer, a polystyrene layer is also desirable. Polystyrene for this purpose includes styrene homopolymer, styrene copolymer, and polystyrene blend [such as high-impact polystyrene (HIPS) containing a small amount of rubber]. These copolymers and blends should contain 80 wt % of styrene or more.

Owing to its high stiffness, polystyrene helps thin-walled containers to retain their shape. Moreover, owing to its good gloss, polystyrene contributes to the appearance of the container (which may be either transparent or opaque). Styrene homopolymer with good clarity contributes to see-through containers.

The polystyrene is not specifically restricted in melt index. A melt index adequate for formability is 0.01–20 g/10 min, preferably 0.1–10 g/10 min. More than one kind of polystyrene may be used in the form of blend.

The layers may be formed from recycled materials including EVOH, ethylene-(meth)acrylic acid copolymer, and adhesive layer.

The layer construction may be the same as mentioned above for the laminate including propylene copolymer.

The thermoformable multilayer structure of the present invention may be produced in any manner which is not specifically restricted. Examples include T-die extrusion, blown-film extrusion, coextrusion, and dry lamination, which are commonly used for polyolefins. Coextrusion is particularly desirable.

The thermoforming of the multilayer structure is not specifically restricted in forming temperature. Forming temperature will vary depending on the sheet stock used; but it should be high enough for the resin to soften sufficiently.

In the case of sheet stock, the forming temperature should not be such that the sheet melts due to heating or the wavy pattern of the metal surface of the heater is transferred to the film (due to excessively high temperature) or forming is incomplete (due to excessively low temperature). To be specific, the sheet temperature should be 130–180° C., preferably 135–160° C., and more particularly 135–155° C.

In the case of laminate comprising EVOH and propylene homopolymer having a Vicat softening point higher than 152° C., it is possible to raise the forming temperature for the sheet because the propylene homopolymer has a high melting point. The high forming temperature makes EVOH softer and provides better thermoformability. However, in the case of laminate comprising EVOH and propylene copolymer (having a Vicat softening point of 152° C. or lower) or polystyrene, thermoforming should be carried out at a comparatively low sheet temperature because propylene copolymer has a low melting point and polystyrene has a low softening point. In this case, EVOH does not become soft enough for satisfactory thermoforming.

According to present invention, EVOH is replaced by a specific composition composed mainly of EVOH, so that the multilayer structure has good thermoformability even when it is laminated with propylene copolymer or polystyrene which has a low thermoformable temperature.

The above-mentioned multilayer structure, especially the multilayer structure in sheet form, or the multilayer structure having layers of propylene copolymer or polystyrene should be thermoformed into containers which satisfy the following conditions.

$$S \leq T/t \leq 20S \quad (5)$$

$$300 \leq T \leq 3000 \quad (6)$$

$$t \geq 100 \quad (7)$$

preferably $$1.5S \leq T/t \leq 15S \quad (5')$$

$$500 \leq T \leq 2000 \quad (6')$$

$$t \geq 200 \quad (7')$$

more preferably $$2S \leq T/t \leq 10S \quad (5'')$$

$$800 \leq T \leq 1500 \quad (6'')$$

$$t \geq 300 \quad (7'')$$

where T stands for the total wall thickness (in $\mu$m) of the thickest part of the container (corresponding to the thickness of the multilayer structure before forming), t stands for the total wall thickness (in $\mu$m) of the thinnest part of the container, and S stands for the draw ratio of the container.

The value of T/t smaller than S implies that the container has a shape that can be thermoformed easily without requiring the multilayer structure of the present invention. The value of T/t greater than 20S implies that the container greatly fluctuates in wall thickness. With T exceeding 3000 $\mu$m, the resulting container would be heavier than necessary and hence uneconomical and difficult to form. With T smaller than 300 $\mu$m, the resulting container would be excessively thin and poor in stiffness. The container having t smaller than 100 $\mu$m is not desirable for the same reason as above.

The thermoformed containers produced from the above-mentioned sheet will be used in many application areas by virtue of good gas barrier properties (due to the resin composition of the present invention). They are suitable for packaging foods (such as custard pudding, jelly, and miso), medicines, agricultural chemicals, and any other products which are deteriorated by oxygen.

EXAMPLES

The invention will be described in more detail with reference to the following examples. The first series of examples are concerned with the thermoforming of multilayer film, and the second series of examples are concerned with the thermoforming of multilayer sheet.

In the first series of examples, containers were produced from multilayer film by thermoforming. In the examples, the following methods were used to evaluate the resin composition (in the form of pellets), the thermoformable film, and the thermoformed container.

Average particle diameter of particles dispersed in the resin composition (pellets):

A sample pellet is cut in one direction parallel to the resin flow and is also cut in two directions perpendicular to the resin flow. The cut surface (in the vicinity of center) is examined under a scanning electron microscope to take a photograph with a magnification of 1000–10000. (The cut surface may be smoothened by a microtome to make particles visible clearly or treated with xylene so as to dissolve dispersed particles and to obtain visible traces of particles.) The photograph undergoes image processing by ASPECT (image measuring tool system of Keio Denshi Kogyo Co., Ltd.), so that the contour of each particle is determined and the particle diameter is obtained from the average of the major and minor axes of the contour. Photographs are taken with the same magnification in three directions such that there are more than 30 particles in each photograph, and particles in the same area are examined. The thus obtained average value of particle diameter is regarded as the average particle diameter.

Average diameter (cross section) of particles dispersed in the thermoformable multilayer film:

A sample is cut in directions perpendicular to the film extrusion direction is examined under a scanning electron microscope to take a photograph with a magnification of 3000–20000. The photograph undergoes image processing by ASPECT (image measuring tool system of Keio Denshi Kogyo Co., Ltd.), so that the contour of each particle is determined and the particle diameter is obtained from the average of the major and minor axes of the contour. The thus obtained average value of particle diameter is regarded as the average particle diameter. Photographs are taken such that there are more than 30 particles in each photograph. If necessary, the cut surface of the sample may be treated in the same manner as in the case of pellet sample (mentioned above).

Wall thickness at corners:

Using a thickness meter, the wall thickness of the thermoformed container is measured at four points on the corner (edge), and the smallest value is recorded.

Average thickness of dispersed particles in the thinnest part of the thermoformed container:

A sample is taken from the thinnest part of the corner (edge) measured as mentioned above, by cutting in the direction perpendicular to the film surface. An ultra-thin section is prepared from the sample using a microtome. It is dyed with luthenium oxide vapor for one day at room temperature. The dyed section is examined under a transmission electron microscope to take photographs with a magnification of 10000–30000. The photograph undergoes image processing by ASPECT (image measuring tool system of Keio Denshi Kogyo Co., Ltd.), so that the contour of each particle is determined and the particle thickness is obtained from the average of the thickness of the contours. In the case of thin particles, the photographs are enlarged by copying prior to image processing.

Shrinkage due to thermoforming:

A specimen (30-mm wide strip) is taken from that part of the thermoformed container which runs perpendicularly to the long side of the mold through the center of the bottom. The length (in mm) of the specimen is measured and compared with the dimensions of the mold, and the shrinkage due to thermoforming is calculated as follows.

Shrinkage (%)=[{(50×2+110)−L}/(50×2+110)]×100 (where L denotes the length of the specimen.)

A large shrinkage is an indication of poor thermoformability.

Appearance of thermoformed container:

Appearance is rated [in four grades; (better) A>B>C>D (worse)] by visually observing streaks, wrinkles, and unevenness on the thermoformed container.

Oxygen permeability:

A specimen is cut out of the bottom of the thermoformed container. After conditioning at 20° C. and 85% RH, it is measured for oxygen permeability using a barrier measuring apparatus (OX-TRAN-10/50A, Modern Control Co., Ltd.).

Haze:

A specimen is cut from the thermoformable film. After coating with silicone oil, the specimen is measured for haze according to ASTM D1003-61 using HR-100 made by Murakami Shikisai Gijutus Kenkyusho.

Drop test:

A sample of container (thermoformed by a rectangular mold measuring 130 mm long, 110 mm wide, and 50 mm deep) is filled with 500 cc of water. The top of the container is closed by heat sealing with a 100-μm thick film of low-density polyethylene. The filled container is dropped on a concrete floor, and the height for the container to break (allowing water to leak) is recorded. This test is repeated for 30 samples and the results are calculated according to JIS K7211 (Section 8 for calculations) to obtain the height for 50% of the samples to break.

Example 1-1

A resin mixture was prepared by dry blending from EVOH (90 wt %) and EMAA (10 wt %) specified below.
EVOH:
  ethylene content: 32 mol %
  degree of hydrolysis: 99.6%
  MI: 3.1 g/10 min (at 210° C. under a load of 2160 g)
  sodium acetate: 65 ppm (by weight as sodium element)
  phosphorus compound: 100 ppm (by weight as phosphorus element in phosphate)
EMAA (ethylene-methacrylic acid copolymer):
  methacrylic acid (MAA): 9 wt %
  MI: 5.7 g/10 min (at 210° C. under a load of 2160 g)
  "Nucrel 0903HC" from Mitsui DuPont Chemical The resin mixture was melted and pelletized by extrusion under the following conditions.
  Extruder: 30-mm twin-screw extruder equipped with kneading discs. L/D=30 (TEX 30 made by The Japan Steel Work, Ltd.) Cylinder temperature:
    190° C. at the lower part of the feed.
    210° C. at the mixing zone and in the vicinity of the die.
  Rotor speed of extruder: 610 rpm
  Motor speed of feeder: 250 rpm
  Throughput: 20 kg/h
  Resin pressure in the cylinder: 20 kg/cm$^2$
  Specific energy: 0.6 kWh/kg A thermoformable 5-layered film (130 μm thick) specified below was prepared by T-die coextrusion.
Layer Construction:
  PA-6/AD/resin composition/AD/LLDPE=20/5/20/5/80 μm Resin composition: The pellets prepared as mentioned above. LLDPE as a heat sealing layer: (linear low-density polyethylene) having an MI of 2.1 g/10 min (at 210° C. under a load of 2160 g), "Ultzex 3520L" from Mitsui Petrochemical Co., Ltd. AD as an adhesive layer: maleic anhydride-modified polyethylene having an MI of 3.3 g/10 min (at 210° C. under a load of 2160 g), "Adomer SF 600" from Mitsui Petrochemical Co., Ltd. PA-6 as a polyamide layer: nylon-6 having an MI of 7.2 g/10 min (at 230° C. under a load of 2160 g), "UBE Nylon 1022B" from Ube Industries, Ltd.

The multilayer film thus obtained was thermoformed into container under the following conditions.
  Thermoforming machine: R530 made by Multiback Co., Ltd.
  Temperature of heating plate: 100° C.
  Heating time: 1.5 seconds
  Film temperature: about 85° C.
  Mold: rectangular (130 mm long, 110 mm wide, 50 mm deep)
  Draw ratio: S=0.45
  Air pressure: 5 kgf/cm$^2$ Tables 1-1 and 1-2 show the properties of the resin composition pellets and thermoformable film and the rating of the thermoformed container.

Comparative Example 1-1

The same procedure as in Example 1-1 was repeated except that EVOH was used alone to make the resin layer. Tables 1-1 and 1-2 show the properties of the resin composition pellets and thermoformable film and the rating of the thermoformed container.

Examples 1-2 and 1-3 and Comparative Example 1-2

The same procedure as in Example 1-1 was repeated except that the mixing ratio of EVOH and EMAA was changed as follows.
  95:5 wt % (in Example 1-2)
  80:20 wt % (in Example 1-3)
  50:50 wt % (in Comparative Example 1-2)
Tables 1-1 and 1-2 show the properties of the resin composition pellets and thermoformable film and the rating of the thermoformed container.

Examples 1-4 and 1-5

The same procedure as in Example 1-1 was repeated except that the EVOH was replaced by the one specified below.

EVOH (in Example 1-4):
   ethylene content: 27 mol %
   degree of hydrolysis: 99.6%
   MI: 3.9 g/10 min (at 210° C. under a load of 2160 g)
EVOH (in Example 1–5):
   ethylene content: 44 mol %
   degree of hydrolysis: 99.7%
   MI: 3.5 g/10 min (at 210° C. under a load of 2160 g)
Tables 1-1 and 1-2 show the properties of the resin composition pellets and thermoformable film and the rating of the thermoformed container.

Examples 1-6 to 1-9

The same procedure as in Example 1-1 was repeated except that the EVOH (90 wt %) was replaced by a mixture of two kinds of EVOH specified below. Tables 1-1 and 1-2 show the properties of the resin composition pellets and thermoformable film and the rating of the thermoformed container.

In Example 1-6:
   EVOH (85 parts by weight)
   ethylene content: 32 mol %
   degree of hydrolysis: 99.6%
   MI: 3.1 g/10 min (at 210° C. under a load of 2160 g)
   EVOH (5 parts by weight)
   ethylene content: 51 mol %
   degree of hydrolysis: 96%
   MI: 15.1 g/10 min (at 210° C. under a load of 2160 g)
In Example 1-7:
   EVOH (85 parts by weight)
   ethylene content: 38 mol %
   degree of hydrolysis: 99.7%
   MI: 3.8 g/10 min (at 210° C. under a load of 2160 g)
   EVOH (5 parts by weight)
   ethylene content: 51 mol %
   degree of hydrolysis: 96%
   MI: 15.1 g/10 min (at 210° C. under a load of 2160 g)
In Example 1-8:
   EVOH (85 parts by weight)
   ethylene content: 38 mol %
   degree of hydrolysis: 99.7%
   MI: 3.8 g/10 min (at 210° C. under a load of 2160 g)
   EVOH (5 parts by weight)
   ethylene content: 44 mol %
   degree of hydrolysis: 99.7%
   MI: 3.5 g/10 min (at 210° C. under a load of 2160 g)
In Example 1-9:
   EVOH (50 parts by weight)
   ethylene content: 32 mol %
   degree of hydrolysis: 99.6%
   MI: 3.1 g/10 min (at 210° C. under a load of 2160 g)
   EVOH (40 parts by weight)
   ethylene content: 51 mol %
   degree of hydrolysis: 96%
   MI: 15.1 g/10 min (at 210° C. under a load of 2160 g)

Examples 1-10 to 1-12 and Comparative Examples 1-3 to 1-7

The same procedure as in Example 1-1 was repeated except that the EMAA was replaced by the one specified below. Tables 1-1 and 1-2 show the properties of the resin composition pellets and thermoformable film and the rating of the thermoformed container.

In Example 1-10:
   EMAA:
   content of methacrylic acid: 4 wt %
   MI: 12.2 g/10 min (at 210° C. under a load of 2160 g)
   product name: "Nucrel AN4214C" from Mitsui DuPont Chemical
In Example 1-11:
   EMAA:
   content of methacrylic acid: 12 wt %
   MI: 13.4 g/10 min (at 210° C. under a load of 2160 g)
   product name: "Nucrel 1207C" from Mitsui DuPont Chemical
In Example 1-12:
   EAA (ethylene-acrylic acid copolymer):
   content of acrylic acid (AA): 9.0 wt %
   MI: 8.7 g/10 min (at 210° C. under a load of 2160 g)
   product name: "Primacol 1430" from Dow Chemical
In Comparative Example 1-3:
   ethylene-methyl methacrylate copolymer:
   content of methyl methacrylate (MMA): 18 wt %
   MI: 12.1 g/10 min (at 210° C. under a load of 2160 g)
   product name: "Acrift WH303" from Sumitomo Chemical
In Comparative Example 1-4:
   maleic anhydride-modified polyethylene:
   MI: 3.6 g/10 min (at 210° C. under a load of 2160 g)
   product name: "Adomer NF500" from Mitsui Petrochemical
In Comparative Example 1-5:
   ionomer:
   MI: 7.6 g/10 min (at 210° C. under a load of 2160 g)
   product name: "Himiran 1652" from Mitsui DuPont Chemical
In Comparative Example 1-6:
   LDPE:
   MI: 3.4 g/10 min (at 210° C. under a load of 2160 g)
   product name: "Mirason B324" from Mitsui DuPont Chemical
In Comparative Example 1-7:
   nylon-6 (PA-6):
   MI: 7.2 g/10 min (at 230° C. under a load of 2160 g)
   product name: "UBE Nylon 1022B" from Ube Industries, Ltd.

Examples 1-13 to 1-16

The same procedure as in Example 1 was repeated except that EVOH and ethylene-(meth)acrylic acid copolymer differing in melt index as specified below were used in combination so that the resulting resin composition has a controlled MI. Tables 1-1 and 1-2 show the properties of the resin composition pellets and thermoformable film and the rating of the thermoformed container.

In Example 1-13:
   EVOH:
   ethylene content: 32 mol %
   degree of hydrolysis: 99.6%
   MI: 1.2 g/10 min (at 210° C. under a load of 2160 g)

EMAA:
　content of methacrylic acid: 9 wt %
　MI: 15.3 g/10 min (at 210° C. under a load of 2160 g)
　product name: "Nucrel NC908HG" from Mitsui DuPont Chemical
In Example 1-14:
　EVOH:
　　ethylene content: 32 mol %
　　degree of hydrolysis: 99.6%
　　MI: 33.0 g/10 min (at 210° C. under a load of 2160 g)
　EMAA:
　　content of methacrylic acid: 9 wt %
　　MI: 5.7 g/10 min (at 210° C. under a load of 2160 g)
　　product name: "Nucrel 0903HC" from Mitsui DuPont Chemical
In Example 1-15:
　EVOH:
　　ethylene content: 32 mol %
　　degree of hydrolysis: 99.6%
　　MI: 1.2 g/10 min (at 210° C. under a load of 2160 g)
　EAA:
　　content of acrylic acid: 9 wt %
　　MI: 18.0 g/10 min (at 210° C. under a load of 2160 g)
　　product name: "Primacol 3440" from Dow Chemical
In Example 1-16:
　EVOH:
　　ethylene content: 32 mol %
　　degree of hydrolysis: 99.6%
　　MI: 33.0 g/10 min (at 210° C. under a load of 2160 g)
　EAA:
　　content of acrylic acid: 9 wt %
　　MI: 5.6 g/10 min (at 210° C. under a load of 2160 g)
　　product name: "Primacol 1420" from Dow Chemical

Example 1-17

The same procedure as in Example 1-1 was repeated except that the mixing and pelletizing of EVOH and EMAA were carried out under the following conditions.
　Extruder: full-flighted single-screw extruder. L/D=26 (GT-40-A made by Placo) Cylinder temperature:
　　190° C. at the lower part of the feed.
　　210° C. at the mixing zone and in the vicinity of the die.
　Rotor speed of extruder: 1500 rpm
　Throughput: 20 kg/h
　Resin pressure in the cylinder: 8 kg/cm$^2$
　Specific energy: 0.1 kWh/kg Tables 1-1 and 1-2 show the properties of the resin composition pellets and thermoformable film and the rating of the thermoformed container.

Example 1-18

The same procedure as in Example 1-17 was repeated except that the full-flighted screw was replaced by a screw equipped with a mixing part at its forward end. Resin pressure in the cylinder was 10 kg/cm$^2$ and the specific energy was 0.15 kWh/kg. Tables 1-1 and 1-2 show the properties of the resin composition pellets and thermoformable film and the rating of the thermoformed container.

Examples 1-19 to 1-21 and Comparative Examples 1-8 and 1-9

The same procedure as in Example 1-1 was repeated except that the layer construction of the multilayer film and the resin composition were changed as follows.
Layer Construction:
　LLDPE/AD/resin composition/AD/PP=80/5/20/5/30 μm
In Example 1-19: the same resin composition as in Example 1-1. In Example 1-20: the same resin composition as in Example 1-6. In Example 1-21: the same resin composition as in Example 1-12. In Comparative Example 1-8: the same resin composition as in Comparative Example 1-3. In Comparative Example 1-9: the same EVOH as in Comparative Example 1-1.

Tables 1-3 and 1-4 show the properties of the thermoformable film and the rating of the thermoformed container.

Examples 1-22 and 1-23 and Comparative Examples 1-10

The same procedure as in Example 1-1 was repeated except that the layer construction of the multilayer film and the resin composition were changed as follows.
Layer Construction:
　LLDPE/AD/resin composition=80/5/20 μm In Example 1-22: the same resin composition as in Example 1-1. In Example 1-23: the same resin composition as in Example 1-6. In Comparative Example 1-10: the same EVOH as in Comparative Example 1-1.

Tables 1-3 and 1-4 show the properties of the thermoformable film and the rating of the thermoformed container.

Examples 1-24 and 1-25 and Comparative Example 1-11

The same procedure as in Example 1-1 was repeated except that the layer construction of the multilayer film and the resin composition were changed as follows.
Layer Construction:
　LLDPE/AD/resin composition/AD/LLDPE=40/5/20/5/40 μm In Example 1-24: the same resin composition as in Example 1-1. In Example 1-25: the same resin composition as in Example 1-6. In Comparative Example 1-11: the same EVOH as in Comparative Example 1-1.

Tables 1-3 and 1-4 show the properties of the thermoformable film and the rating of the thermoformed container.

In the following examples, the multilayer sheets were made into containers by thermoforming. The following methods were used to evaluate the thermoformable multilayer structure and the thermoformed container.

Average diameter (cross section) of particles dispersed in the thermoformable multilayer structure:

A sample is cut in directions parallel and perpendicular to the extrusion direction of the multilayer structure and is examined under a scanning electron microscope to take a photograph with a magnification of 3000–20000. (The cut surface may be smoothened by a microtome to make particles visible clearly or treated with xylene so that dispersed particles are dissolved and their visible traces are left.) The photograph undergoes image processing by ASPECT (image measuring tool system of Keio Denshi Kogyo Co., Ltd.), so that the contour of each particle is determined and the particle diameter is obtained from the average of the major and minor axes of the contour. The thus obtained average value of particle diameter is regarded as the average particle diameter. Photographs are taken such that there are more than 30 particles in each photograph.

Vicat softening point:
The resin or resin composition is made into a single-layer sheet, from which a specimen (with a thickness of 3 mm and an area of 10×10 cm$^2$) is cut out. The Vicat softening point of the specimen is measured according ASTM-D1525 using an apparatus for measuring Vicat softening point. An average for three specimens is taken.

Haze:

A specimen is cut out of the thermoformable multilayer structure. After coating with silicone oil, the specimen is measured for haze according to ASTM D1003-61 using HR-100 made by Murakami Shikisai Gijutus Kenkyusho.

Oxygen permeability:

A specimen is cut out of the thermoformable multilayer structure. After conditioning at 20° C. and 85% RH, it is measured for oxygen permeability using a barrier measuring apparatus (OX-TRAN-10/50A, Modern Control Co., Ltd.).

Appearance of thermoformed container:

A container is made by thermoforming at a sheet temperature of 150° C. using a rectangular mold (measuring 130 mm long, 110 mm wide, and 50 mm deep). The container is examined for appearance by visual observation of the following items.

Thermoformability is rated [in four grades; (better) A>B>C >D (worse)] by observing edges (at the intersection of the side and the bottom).

Cracking is rated [in four grades; (better) A>B>C>D (worse)] by observing cracks (about 2 mm long) that have appeared on the side near the bottom.

Wavy patterns are rated [in four grades; (better) A>B>C>D (worse)] by observing on the side of the container.

Thickness of the thinnest part:

The thinnest part at the intersection of the side and the bottom is measured.

Drop test:

The thermoformed container is filled with 200 cc of water. On the filled container is placed another thermoformed container of the same type in an inverted direction. Both containers are heat-sealed together. The container is dropped on a concrete floor, and the height for the container to break (allowing water to leak) is recorded. This test is repeated for 30 samples and the results are calculated according to JIS K7211 (Section 8 for calculations) to obtain the height for 50% of the samples to break.

Example 2-1

A resin mixture was prepared by dry blending from EVOH (90 wt %) and EMAA (10 wt %) specified below.
EVOH:
  ethylene content: 32 mol %
  degree of hydrolysis: 99.6%
  MI: 3.1 g/10 min (at 210° C. under a load of 2160 g)
  sodium acetate: 65 ppm (by weight as sodium element)
  phosphorus compound: 100 ppm (by weight as phosphorus element in phosphate)
EMAA (ethylene-methacrylic acid copolymer):
  methacrylic acid (MAA): 9 wt %
  MI: 5.7 g/10 min (at 210° C. under a load of 2160 g)
  "Nucrel 0903HC" from Mitsui DuPont Chemical
The resin mixture was melted and pelletized by extrusion under the following conditions.
  Extruder: 30-mm twin-screw extruder equipped with kneading discs. L/D=30 (TEX 30 made by The Japan Steel Work, Ltd.) Cylinder temperature:
    190° C. at the lower part of the feed.
    210° C. at the mixing zone and in the vicinity of the die.
  Rotor speed of extruder: 610 rpm
  Motor speed of feeder: 250 rpm
  Throughput: 20 kg/h
  Resin pressure in the cylinder: 20 kg/cm$^2$
  Specific energy: 0.6 kWh/kg A thermoformable 5-layered sheet (1000 μm thick) specified below was prepared by T-die coextrusion.
Layer construction:
  coPP/AD/resin composition/AD/coPP=400/50/100/50/400 μm Resin composition: The pellets prepared as mentioned above. coPP as inner and outer layers: (propylene random copolymer) having an MI of 6 g/10 min (at 230° C. under a load of 2160 g) and a Vicat softening point of 135° C., "F226D" from Grand Polymer. AD as an adhesive layer: maleic anhydride-modified polypropylene having an MI of 5.3 g/10 min (at 230° C. under a load of 2160 g), "Adomer QF-500" from Mitsui Petrochemical Co., Ltd.

The multilayer sheet thus obtained was examined for particle diameter (in the layer of the resin composition), haze, and oxygen permeability.

The multilayer sheet was then thermoformed into a cuplike container at varied sheet temperatures under the following conditions.
  Thermoforming machine: made by Asano Seisakusho.
  Mold: cylindrical (70 mm in diameter, 70 mm deep)
  Draw ratio: S=1.0
  Air pressure: 5 kg/cm$^2$
  Plug: 45 mm in diameter, 65 mm long, syntax form.
  Plug temperature: 150° C.
  Mold temperature: 70° C.

The thickness of the thinnest part (at the intersection of the side and the bottom) was measured and the thermoformed container (after filling with water) underwent drop test.

Tables 2-1 and 2-2 show the properties of the thermoformable sheet and the rating of the thermoformed container.

Comparative Example 2-1

The same procedure as in Example 2-1 was repeated except that EVOH was used alone to make the resin layer. Tables 2-1 and 2-2 show the properties of the sheet and the rating of the thermoformed container.

Examples 2-2 to 2-18 and Comparative Examples 2-2 to 2-7

The same procedure as in Example 2-1 was repeated except that the resin composition was replaced by those shown below. Tables 2-1 and 2-2 show the properties of the sheet and the rating of the thermoformed container.

In Example 2-2: Resin composition used in Example 1-2.
In Example 2-3: Resin composition used in Example 1-3.
In Example 2-4: Resin composition used in Example 1-4.
In Example 2-5: Resin composition used in Example 1-5.
In Example 2-6: Resin composition used in Example 1-6.
In Example 2-7: Resin composition used in Example 1-7.
In Example 2-8: Resin composition used in Example 1-8.
In Example 2-9: Resin composition used in Example 1-9.
In Example 2-10: Resin composition used in Example 1-10.
In Example 2-11: Resin composition used in Example 1-11.
In Example 2-12: Resin composition used in Example 1-12.
In Example 2-13: Resin composition used in Example 1-13.

In Example 2-14: Resin composition used in Example 1-14.

In Example 2-15: Resin composition used in Example 1-15.

In Example 2-16: Resin composition used in Example 1-16.

In Example 2-17: Resin composition used in Example 1-17.

In Example 2-18: Resin composition used in Example 1-18.

In Comparative Example 2-2: Resin composition used in Comparative Example 1-2.

In Comparative Example 2-3: Resin composition used in Comparative Example 1-3.

In Comparative Example 2-4: Resin composition used in Comparative Example 1-4.

In Comparative Example 2-5: Resin composition used in Comparative Example 1-5.

In Comparative Example 2-6: Resin composition used in Comparative Example 1-6.

In Comparative Example 2-7: Resin composition used in Comparative Example 1-7.

Example 3-1

A resin mixture was prepared by dry blending from EVOH (90 wt %) and EMAA (10 wt %) specified below.
EVOH:
  ethylene content: 32 mol %
  degree of hydrolysis: 99.6%
  MI: 3.1 g/10 min (at 210° C. under a load of 2160 g)
  sodium acetate: 65 ppm (by weight as sodium element)
  phosphorus compound: 100 ppm (by weight as phosphorus element in phosphate)
EMAA (ethylene-methacrylic acid copolymer):
  methacrylic acid (MAA): 9 wt %
  MI: 5.7 g/10 min (at 210° C. under a load of 2160 g)
  "Nucrel 0903HC" from Mitsui DuPont Chemical The resin mixture was melted and pelletized by extrusion under the following conditions.
  Extruder: 30-mm twin-screw extruder equipped with kneading discs. L/D=30 (TEX 30 made by The Japan Steel Work, Ltd.) Cylinder temperature:
  190° C. at the lower part of the feed.
  210° C. at the mixing zone and in the vicinity of the die.
  Rotor speed of extruder: 610 rpm
  Motor speed of feeder: 250 rpm
  Throughput: 20 kg/h
  Resin pressure in the cylinder: 20 kg/cm$^2$
  Specific energy: 0.6 kWh/kg A thermoformable 5-layered sheet (1000 μm thick) specified below was prepared by T-die coextrusion.
Layer construction:
  HIPS/AD/resin composition/AD/HIPS=400/50/100/50/400 μm Resin composition: The pellets prepared as mentioned above. HIPS as inner and outer layers: (high-impact polystyrene) having an MI of 3 g/10 min (at 200° C., under a load of 2160 g), "Idemitsu Styrol ET61" from Idemtisu Petrochemical. AD as an adhesive layer: partially hydrolyzed ethylene-vinyl acetate copolymer, having an MI of 6 g/10 min (at 210° C. under a load of 2160 g), "Mercen M-5430" from Toso.

The multilayer sheet thus obtained was examined for particle diameter (in the layer of the resin composition), haze, and oxygen permeability.

The multilayer sheet was then thermoformed into a cup-like container at varied sheet temperatures under the following conditions.
  Thermoforming machine: made by Asano Seisakusho.
  Mold: cylindrical (70 mm in diameter, 70 mm deep)
  Draw ratio: S=1.0
  Air pressure: 5 kg/cm$^2$
  Plug: 45 mm in diameter, 65 mm long, syntax form.
  Plug temperature: 150° C.
  Mold temperature: 70° C.

The thickness of the thinnest part (at the intersection of the side and the bottom) was measured and the thermoformed container (after filling with water) underwent drop test.

Tables 3-1 and 3-2 show the properties of the thermoformable sheet and the rating of the thermoformed container.

Comparative Example 3-1

The same procedure as in Example 3-1 was repeated except that EVOH was used alone to make the resin layer. Tables 3-1 and 3-2 show the properties of the sheet and the rating of the thermoformed container.

Examples 3-2 to 3-18 and Comparative Examples 3-2 to 3-7

The same procedure as in Example 3-1 was repeated except that the resin composition was replaced by those shown below. Tables 3-1 and 3-2 show the properties of the sheet and the rating of the thermoformed container.

In Example 3-2: Resin composition used in Example 1-2.

In Example 3-3: Resin composition used in Example 1-3.

In Example 3-4: Resin composition used in Example 1-4.

In Example 3-5: Resin composition used in Example 1-5.

In Example 3-6: Resin composition used in Example 1-6.

In Example 3-7: Resin composition used in Example 1-7.

In Example 3-8: Resin composition used in Example 1-8.

In Example 3-9: Resin composition used in Example 1-9.

In Example 3-10: Resin composition used in Example 1-10.

In Example 3-11: Resin composition used in Example 1-11.

In Example 3-12: Resin composition used in Example 1-12.

In Example 3-13: Resin composition used in Example 1-13.

In Example 3-14: Resin composition used in Example 1-14.

In Example 3-15: Resin composition used in Example 1-15.

In Example 3-16: Resin composition used in Example 1-16.

In Example 3-17: Resin composition used in Example 1-17.

In Example 3-18: Resin composition used in Example 1-18.

In Comparative Example 3-2: Resin composition used in Comparative Example 1-2.

In Comparative Example 3-3: Resin composition used in Comparative Example 1-3.

In Comparative Example 3-4: Resin composition used in Comparative Example 1-4.

In Comparative Example 3-5: Resin composition used in Comparative Example 1-5.

In Comparative Example 3-6: Resin composition used in Comparative Example 1-6.

In Comparative Example 3-7: Resin composition used in Comparative Example 1-7.

Examples 4-1 to 4-4

The same procedure as in Example 2-1 was repeated except that the propylene random copolymer for the inner and outer layers was replaced by the resin or resin composition specified below. Tables 4-1 and 4-2 show the properties of the thermoformable sheet and the rating of the thermoformed container.

In Example 4-1: propylene block copolymer having an MI of 24 g/10 min (230° C., 2160 g) and a Vicat softening point of 150° C. "F769" from Grand Polymer.

In Example 4-2: resin composition composed of 70 wt % of component A and 30 wt % of component B, having a Vicat softening point of 141° C. Component A: propylene random copolymer having an MI of 6 g/10 min (230° C., 2160 g) and a Vicat softening point of 135° C. "F226D" from Grand Polymer.

Component B: propylene homopolymer having an MI of 3.0 g/10 min (230° C., 2160 g) and a Vicat softening point of 155° C. "J103" from Grand Polymer.

In Example 4-3: styrene homopolymer (PS) having an MI of 4 g/10 min (200° C., 2160 g), "Idemitsu Styrol HH30E" from Idemitsu Petrochemical.

In Example 4-4: propylene homopolymer having an MI of 3.0 g/10 min (230° C., 2160 g) and a Vicat softening point of 155° C. "J103" from Grand Polymer.

Examples 4-4 to 4-8

The same procedure as in Example 2-6 was repeated except that the propylene random copolymer for the inner and outer layers was replaced by the resin or resin composition specified below. Tables 4-1 and 4-2 show the properties of the thermoformable sheet and the rating of the thermoformed container.

In Example 4-5: propylene block copolymer having an MI of 24 g/10 min (230° C., 2160 g) and a Vicat softening point of 150° C. "F769" from Grand Polymer.

In Example 4-6: resin composition composed of 70 wt % of component A and 30 wt % of component B, having a Vicat softening point of 141° C. Component A: propylene random copolymer having an MI of 6 g/10 min (230° C., 2160 g) and a Vicat softening point of 135° C. "F226D" from Grand Polymer.

Component B: propylene homopolymer having an MI of 3.0 g/10 min (230° C., 2160 g) and a Vicat softening point of 155° C. "J103" from Grand Polymer.

In Example 4-7: styrene homopolymer (PS) having an MI of 4 g/10 min (200° C., 2160 g), "Idemitsu Styrol HH30E" from Idemitsu Petrochemical.

In Example 4-8: propylene homopolymer having an MI of 3.0 g/10 min (230° C., 2160 g) and a Vicat softening point of 155° C. "J103" from Grand Polymer.

Comparative Examples 4-1 to 4-4

The same procedure as in Comparative Example 2-1 was repeated except that the propylene random copolymer for the inner and outer layers was replaced by the resin or resin composition specified below. Tables 4-1 and 4-2 show the properties of the thermoformable sheet and the rating of the thermoformed container.

In Comparative Example 4-1: propylene block copolymer having an MI of 24 g/10 min (230° C., 2160 g) and a Vicat softening point of 150° C. "F769" from Grand Polymer.

In Comparative Example 4-2: resin composition composed of 70 wt % of component A and 30 wt % of component B, having a Vicat softening point of 141° C.

Component A: propylene random copolymer having an MI of 6 g/10 min (230° C., 2160 g) and a Vicat softening point of 135° C. "F226D" from Grand Polymer.

Component B: propylene homopolymer having an MI of 3.0 g/10 min (230° C., 2160 g) and a Vicat softening point of 155° C. "J103" from Grand Polymer.

In Comparative Example 4-3: styrene homopolymer (PS) having an MI of 4 g/10 min (200° C., 2160 g), "Idemitsu Styrol HH30E" from Idemitsu Petrochemical.

In Comparative Example 4-4: propylene homopolymer having an MI of 3.0 g/10 min (230° C., 2160 g) and a Vicat softening point of 155° C. "J103" from Grand Polymer.

Example 4-9

The same procedure as in Example 2-1 was repeated to give a 5-layered thermoformable sheet specified below except that the propylene copolymer for the outer layer was replaced by a composition of recycled material obtained by crushing, melting, and pelletizing the thermoformable sheet in Example 2-1.

Layer Construction:

coPP/AD/resin composition/AD/recycled resin composition=400/50/100/50/400 μm

Tables 4-1 and 4-2 show the properties of the thermoformable sheet and the rating of the thermoformed container.

Example 4-10

The same procedure as in Example 3-1 was repeated to give a 5-layered thermoformable sheet specified below except that high-impact polystyrene (HIPS) for the outer layer was replaced by a composition of recycled material obtained by crushing, melting, and pelletizing the thermoformable sheet in Example 3-1.

Layer Construction:

HIPS/AD/resin composition/AD/recycled resin composition=400/50/100/50/400 μm

Tables 4-1 and 4-2 show the properties of the thermoformable sheet and the rating of the thermoformed container.

[Effect of the Invention]

The present invention provides a thermoformable film or sheet to be formed into a container which is superior in gas barrier properties, mechanical properties, and appearance and hence is suitable for packaging of various kinds of products.

TABLE 1-1

| | EVOH | | | Resin incorporated | | | | |
| --- | --- | --- | --- | --- | --- | --- | --- | --- |
| | Ethylene Content mol % | MI(A) g/10 min | Amount wt % | Kind of Resin | MI(B) g/10 min | Amount wt % | MI(A)/MI(B) | Remarks |
| Example 1-1 | 32 | 3.1 | 90 | EMAA (MAA 9 wt %) | 5.7 | 10 | 0.54 | |
| Comparative Example 1-1 | 32 | 3.1 | 100 | — | — | 0 | — | |
| Example 1-2 | 32 | 3.1 | 95 | EMAA (MAA 9 wt %) | 5.7 | 5 | 0.54 | |
| Example 1-3 | 32 | 3.1 | 80 | EMAA (MAA 9 wt %) | 5.7 | 20 | 0.54 | |
| Comparative Example 1-2 | 32 | 3.1 | 50 | EMAA (MAA 9 wt %) | 5.7 | 50 | 0.54 | |
| Example 1-4 | 27 | 3.9 | 90 | EMAA (MAA 9 wt %) | 5.7 | 10 | 0.68 | |
| Example 1-5 | 44 | 3.5 | 90 | EMAA (MAA 9 wt %) | 5.7 | 10 | 0.61 | |
| Example 1-6 | 33 | 3.8 | 90 | EMAA (MAA 9 wt %) | 5.7 | 10 | 0.66 | *1) |
| Example 1-7 | 39 | 4.4 | 90 | EMAA (MAA 9 wt %) | 5.7 | 10 | 0.77 | *2) |
| Example 1-8 | 38 | 3.8 | 90 | EMAA (MAA 9 wt %) | 5.7 | 10 | 0.66 | *3) |
| Example 1-9 | 40 | 8.4 | 90 | EMAA (MAA 9 wt %) | 5.7 | 10 | 1.47 | *4) |
| Example 1-10 | 32 | 3.1 | 90 | EMAA (MAA 4 wt %) | 12.2 | 10 | 0.25 | |
| Example 1-11 | 32 | 3.1 | 90 | EMAA (MAA 12 wt %) | 13.4 | 10 | 0.23 | |
| Example 1-12 | 32 | 3.1 | 90 | EAA (AA 9 wt %) | 8.7 | 10 | 0.36 | |
| Comparative Example 1-3 | 32 | 3.1 | 90 | EMMA (MMA 18 wt %) | 12.1 | 10 | 0.26 | |
| Comparative Example 1-4 | 32 | 3.1 | 90 | Maleic anhydride-PE | 3.6 | 10 | 0.86 | |
| Comparative Example 1-5 | 32 | 3.1 | 90 | Ionomer | 7.6 | 10 | 0.41 | |
| Comparative Example 1-6 | 32 | 3.1 | 90 | LDPE | 3.4 | 10 | 0.91 | |
| Comparative Example 1-7 | 32 | 3.1 | 90 | PA | 7.2 | 10 | 0.43 | |
| Example 1-13 | 32 | 1.2 | 90 | EMAA (MAA 9 wt %) | 15.3 | 10 | 0.078 | |
| Example 1-14 | 32 | 33 | 90 | EMAA (MAA 9 wt %) | 5.7 | 10 | 5.79 | |
| Example 1-15 | 32 | 1.2 | 90 | EAA (AA 9 wt %) | 18 | 10 | 0.067 | |
| Example 1-16 | 32 | 33 | 90 | EAA (AA 9 wt %) | 5.6 | 10 | 5.89 | |
| Example 1-17 | 32 | 3.1 | 90 | EMAA (MAA 9 wt %) | 5.7 | 10 | 0.54 | *5) |
| Example 1-18 | 32 | 3.1 | 90 | EMAA (MAA 9 wt %) | 5.7 | 10 | 0.54 | *6) |

*1) 85 wt % of EVOH (Ethylene content 32 mol %, MI 3.1 g/10 min) and 5 wt % of EVOH (Ethylene content 51 mol %, MI 15.1 g/10 min)
*2) 85 wt % of EVOH (Ethylene content 38 mol %, MI 3.8 g/10 min) and 5 wt % of EVOH (Ethylene content 51 mol %, MI 15.1 g/10 min)
*3) 85 wt % of EVOH (Ethylene content 38 mol %, MI 3.8 g/10 min) and 5 wt % of EVOH (Ethylene content 44 mol %, MI 3.5 g/10 min)
*4) 50 wt % of EVOH (Ethylene content 32 mol %, MI 3.1 g/10 min) and 40 wt % of EVOH (Ethylene content 51 mol %, MI 15.1 g/10 min)
*5) Full-flighted single-screw extruder was used
*6) Extruder with a screw equipped with a mixing part at its forward end was used

TABLE 1-2

| | State of dispersion of resin particles | | | Thermoformed container | | | | | |
| --- | --- | --- | --- | --- | --- | --- | --- | --- | --- |
| | Pellets Particle diameter μm | Film Particle diameter in cross section μm | Container Particle thickness μm | Film Haze % | Thickness of thinnest part μm | Molding shrinkage % | Appearance A~D | Oxygen permeability *1) | Drop height for breakage m |
| Example 1-1 | 0.83 | 0.51 | 0.13 | 4 | 33 | 8 | A | 4.1 | 3.8 |
| Comparative Example 1-1 | — | — | — | 3 | 14 | 6 | D | 3.5 | 2.1 |
| Example 1-2 | 0.85 | 0.52 | 0.12 | 3 | 31 | 7 | B | 3.8 | 3.3 |
| Example 1-3 | 0.82 | 0.49 | 0.09 | 6 | 31 | 9 | B | 7.5 | 3.9 |
| Comparative Example 1-2 | 0.81 | 0.49 | 0.09 | 8 | 26 | 12 | B | 13.2 | 4.1 |
| Example 1-4 | 0.78 | 0.46 | 0.08 | 3 | 32 | 7 | B | 3.6 | 3.3 |
| Example 1-5 | 0.79 | 0.47 | 0.11 | 4 | 36 | 9 | B | 7.8 | 3.7 |
| Example 1-6 | 0.66 | 0.39 | 0.07 | 3 | 36 | 8 | A | 3.9 | 3.9 |
| Example 1-7 | 0.68 | 0.42 | 0.07 | 3 | 35 | 8 | A | 5.1 | 4.1 |
| Example 1-8 | 0.73 | 0.44 | 0.08 | 3 | 33 | 9 | A | 5.5 | 4.1 |
| Example 1-9 | 0.70 | 0.43 | 0.08 | 4 | 33 | 9 | A | 6.9 | 4.3 |
| Example 1-10 | 0.87 | 0.55 | 0.15 | 4 | 32 | 8 | A | 4.2 | 3.6 |
| Example 1-11 | 0.76 | 0.48 | 0.09 | 4 | 31 | 8 | A | 4.2 | 3.5 |
| Example 1-12 | 0.92 | 0.59 | 0.21 | 4 | 31 | 8 | A | 4.3 | 3.5 |
| Comparative Example 1-3 | 1.56 | 1.32 | 1.13 | 5 | 25 | 8 | C | 17.3 | 2.9 |
| Comparative Example 1-4 | 1.58 | 1.36 | 1.16 | 12 | 18 | 10 | D | 17.5 | 2.7 |
| Comparative Example 1-5 | 1.48 | 1.36 | 1.13 | 7 | 26 | 8 | C | 14.7 | 2.5 |
| Comparative Example 1-6 | 1.62 | 1.41 | 1.11 | 13 | 15 | 12 | D | 25.1 | 2.6 |
| Comparative Example 1-7 | 0.17 | 0.13 | 0.03 | 4 | 22 | 10 | C | 5.3 | 3.1 |
| Example 1-13 | 1.37 | 1.18 | 0.55 | 6 | 25 | 8 | C | 7.9 | 2.9 |
| Example 1-14 | 1.44 | 1.19 | 0.64 | 6 | 23 | 8 | C | 7.8 | 2.6 |
| Example 1-15 | 1.49 | 1.18 | 0.59 | 6 | 25 | 8 | C | 7.9 | 2.8 |
| Example 1-16 | 1.48 | 0.72 | 0.62 | 5 | 22 | 8 | D | 7.4 | 2.7 |
| Example 1-17 | 1.39 | 0.66 | 0.51 | 7 | 23 | 9 | D | 10.4 | 2.4 |
| Example 1-18 | 1.33 | 0.61 | 0.49 | 6 | 25 | 8 | C | 8.7 | 2.9 |

*1) ml/m2 · day · atm

TABLE 1-3

|  | Components in resin composition | Construction of laminate(μm) |
|---|---|---|
| Example 1-19 | EVOH + EMAA | LLDPE/AD/composition/AD/PP(80/5/20/5/30) |
| Example 1-20 | EVOH(two kinds) + EMAA | LLDPE/AD/composition/AD/PP(80/5/20/5/30) |
| Example 1-21 | EVOH + EAA | LLDPE/AD/composition/AD/PP(80/5/20/5/30) |
| Comparative Example 1-8 | EVOH + EMMA | LLDPE/AD/composition/AD/PP(80/5/20/5/30) |
| Comparative Example 1-9 | EVOH alone | LLDPE/AD/composition/AD/PP(80/5/20/5/30) |
| Example 1-22 | EVOH + EMAA | LLDPE/AD/composition(80/5/20) |
| Example 1-23 | EVOH(two kinds) + EMAA | LLDPE/AD/composition(80/5/20) |
| Comparative Example 1-10 | EVOH alone | LLDPE/AD/EVOH(80/5/20) |
| Example 1-24 | EVOH + EMAA | LLDPE/AD/composition/AD/LLDPE(40/5/20/5/40) |
| Example 1-25 | EVOH(two kinds) + EMAA | LLDPE/AD/composition/AD/LLDPE(40/5/20/5/40) |
| Comparative Example 1-11 | EVOH alone | LLDPE/AD/EVOH/AD/LLDPE(40/5/20/5/40) |

TABLE 1-4

|  | State of dispersion of resin particles | | | | Thermoformed container | | | | |
|---|---|---|---|---|---|---|---|---|---|
|  | Pellets Particle diameter μm | Film Particle diameter in cross section μm | Container Particle thickness μm | Film Haze % | Thickness of thinnest part μm | Molding shrinkage % | Appearance A~D | Oxygen permeability *1) | Drop height for breakage m |
| Example 1-19 | 0.83 | 0.49 | 0.14 | 4 | 28 | 8 | B | 4.3 | 4.2 |
| Example 1-20 | 0.66 | 0.38 | 0.07 | 3 | 31 | 8 | A | 4.1 | 4.4 |
| Example 1-21 | 0.92 | 0.58 | 0.23 | 4 | 26 | 8 | B | 4.7 | 4.1 |
| Comparative Example 1-8 | 1.56 | 1.32 | 1.14 | 5 | 22 | 8 | C | 17.3 | 3.2 |
| Comparative Example 1-9 | — | — | — | 4 | 12 | 6 | D | 4.6 | 2.4 |
| Example 1-22 | 0.83 | 0.52 | 0.15 | 3 | 25 | 7 | B | 4.3 | 3.1 |
| Example 1-23 | 0.66 | 0.39 | 0.07 | 3 | 30 | 8 | A | 4.1 | 3.6 |
| Comparative Example 1-10 | — | — | — | 3 | 11 | 6 | D | 6.8 | 1.7 |
| Example 1-24 | 0.83 | 0.52 | 0.14 | 4 | 26 | 7 | C | 4.1 | 3.3 |
| Example 1-25 | 0.66 | 0.38 | 0.07 | 3 | 30 | 7 | A | 4.1 | 3.5 |
| Comparative Example 1-11 | — | — | — | 3 | 13 | 6 | D | 7.4 | 1.9 |

*1) ml/m2 · day · atm

TABLE 2-1

|  | EVOH | | | Resin incorporated | | | | Particle diameter of cross section μm | Haze % | Oxygen Permeability *1) | Remarks |
|---|---|---|---|---|---|---|---|---|---|---|---|
|  | Ethylene Content mol % | MI(A) g/10 min | Amount wt % | Kind of Resin | MI(B) g/10 min | Amount wt % | MI(A)/ MI(B) | | | | |
| Example 2-1 | 32 | 3.1 | 90 | EMAA (MAA 9 wt %) | 5.7 | 10 | 0.54 | 0.55 | 10 | 2.7 | |
| Comparative Example 2-1 | 32 | 3.1 | 100 | — | — | 0 | — | — | 15 | 2.1 | |
| Example 2-2 | 32 | 3.1 | 95 | EMAA (MAA 9 wt %) | 5.7 | 5 | 0.54 | 0.58 | 13 | 2.6 | |
| Example 2-3 | 32 | 3.1 | 80 | EMAA (MAA 9 wt %) | 5.7 | 20 | 0.54 | 0.53 | 14 | 5.6 | |
| Comparative Example 2-2 | 32 | 3.1 | 50 | EMAA (MAA 9 wt %) | 5.7 | 50 | 0.54 | 0.53 | 23 | 10.4 | |
| Example 2-4 | 27 | 3.9 | 90 | EMAA (MAA 9 wt %) | 5.7 | 10 | 0.68 | 0.52 | 13 | 3.1 | |
| Example 2-5 | 44 | 3.5 | 90 | EMAA (MAA 9 wt %) | 5.7 | 10 | 0.61 | 0.61 | 15 | 4.8 | |
| Example 2-6 | 33 | 3.8 | 90 | EMAA (MAA 9 wt %) | 5.7 | 10 | 0.66 | 0.49 | 9 | 2.6 | *2) |
| Example 2-7 | 39 | 4.4 | 90 | EMAA (MAA 9 wt %) | 5.7 | 10 | 0.77 | 0.47 | 10 | 3.7 | *3) |
| Example 2-8 | 38 | 3.8 | 90 | EMAA (MAA 9 wt %) | 5.7 | 10 | 0.66 | 0.49 | 10 | 3.8 | *4) |
| Example 2-9 | 40 | 8.4 | 90 | EMAA (MAA 9 wt %) | 5.7 | 10 | 1.47 | 0.51 | 10 | 4.2 | *5) |
| Example 2-10 | 32 | 3.1 | 90 | EMAA (MAA 4 wt %) | 12.2 | 10 | 0.25 | 0.55 | 18 | 2.6 | |
| Example 2-11 | 32 | 3.1 | 90 | EMAA (MAA 12 wt %) | 13.4 | 10 | 0.23 | 0.64 | 16 | 2.5 | |
| Example 2-12 | 32 | 3.1 | 90 | EAA (AA 9 wt %) | 8.7 | 10 | 0.36 | 1.44 | 31 | 2.5 | |
| Comparative Example 2-3 | 32 | 3.1 | 90 | EMAA (MAA 18 wt %) | 12.1 | 10 | 0.26 | 1.48 | 27 | 14.4 | |
| Comparative Example 2-4 | 32 | 3.1 | 90 | Maleic anhydride-PE | 3.6 | 10 | 0.86 | 1.49 | 25 | 13.9 | |
| Comparative Example 2-5 | 32 | 3.1 | 90 | Ionomer | 7.6 | 10 | 0.41 | 0.27 | 21 | 10.3 | |

TABLE 2-1-continued

| | EVOH | | | Resin incorporated | | | | Particle diameter of cross section μm | Haze % | Oxygen Permeability *1) | Remarks |
|---|---|---|---|---|---|---|---|---|---|---|---|
| | Ethylene Content mol % | MI(A) g/10 min | Amount wt % | Kind of Resin | MI(B) g/10 min | Amount wt % | MI(A)/ MI(B) | | | | |
| Comparative Example 2-6 | 32 | 3.1 | 90 | LDPE | 3.4 | 10 | 0.91 | 1.23 | 33 | 18.8 | |
| Comparative Example 2-7 | 32 | 3.1 | 90 | PA | 7.2 | 10 | 0.43 | 1.32 | 15 | 3.1 | |
| Example 2-13 | 32 | 1.2 | 90 | EMAA (MAA 9 wt %) | 15.3 | 10 | 0.078 | 1.23 | 21 | 5.5 | |
| Example 2-14 | 32 | 33 | 90 | EMAA (MAA 9 wt %) | 5.7 | 10 | 5.79 | 1.27 | 11 | 5.3 | |
| Example 2-15 | 32 | 1.2 | 90 | EAA (AA 9 wt %) | 18 | 10 | 0.067 | 1.25 | 16 | 5.5 | |
| Example 2-16 | 32 | 33 | 90 | EAA (AA 9 wt %) | 5.6 | 10 | 5.89 | 0.81 | 17 | 5.8 | |
| Example 2-17 | 32 | 3.1 | 90 | EMAA (MAA 9 wt %) | 5.7 | 10 | 0.54 | 0.74 | 32 | 7.8 | *6) |
| Example 2-18 | 32 | 3.1 | 90 | EMAA (MAA 9 wt %) | 5.7 | 10 | 0.54 | 0.71 | 18 | 5.6 | *7) |

*1) ml/m² · day · atm
*2) 85 wt % of EVOH (Ethylene content 32 mol %, MI 3.1 g/10 min) and 5 wt % of EVOH (Ethylene content 51 mol %, MI 15.1 g/10 min)
*3) 85 wt % of EVOH (Ethylene content 38 mol %, MI 3.8 g/10 min) and 5 wt % of EVOH (Ethylene content 51 mol %, MI 15.1 g/10 min)
*4) 85 wt % of EVOH (Ethylene content 38 mol %, MI 3.8 g/10 min) and 5 wt % of EVOH (Ethylene content 44 mol %, MI 3.5 g/10 min)
*5) 50 wt % of EVOH (Ethylene content 32 mol %, MI 3.1 g/10 min) and 40 wt % of EVOH (Ethylene content 51 mol %, MI 15.1 g/10 min)
*6) Full-flighted single-screw extruder was used
*7) Extruder with a screw equipped with a mixing part at its forward end was used

TABLE 2-2

| | | | Sheet heating temperature(° C.) | | | | |
|---|---|---|---|---|---|---|---|
| | | | 130 | 140 | 150 | 160 | 170 |
| Example 2-1 | Appearance of container | *1) | B B B | B B B | A A A | A A A | A A B |
| | Thickness of thinnest part | μm | 680 | 645 | 630 | 625 | 625 |
| | Drop height for brakage | m | | | 6.9 | | |
| Comparative Example 2-1 | Appearance of container | *1) | D D D | C D D | B C C | A C C | B C D |
| | Thickness of thinnest part | μm | 640 | 610 | 520 | 520 | 520 |
| | Drop height for brakage | m | | | 4.5 | | |
| Example 2-2 | Appearance of container | *1) | C C C | C C B | B B B | A A A | A A A |
| | Thickness of thinnest part | μm | 690 | 660 | 645 | 630 | 610 |
| | Drop height for brakage | m | | | 7.3 | | |
| Example 2-3 | Appearance of container | *1) | C C C | B B B | A A A | A A B | A A B |
| | Thickness of thinnest part | μm | 630 | 620 | 610 | 600 | 605 |
| | Drop height for brakage | m | | | 7.5 | | |
| Comparative Example 2-2 | Appearance of container | *1) | B C C | B B B | B B B | B C D | B C D |
| | Thickness of thinnest part | μm | 610 | 590 | 580 | 560 | 560 |
| | Drop height for brakage | m | | | 7.0 | | |
| Example 2-4 | Appearance of container | *1) | C C C | B B B | A A A | A A A | A A B |
| | Thickness of thinnest part | μm | 680 | 645 | 630 | 625 | 625 |
| | Drop height for brakage | m | | | 7.1 | | |
| Example 2-5 | Appearance of container | *1) | C C C | C B B | B B B | A A A | A A B |
| | Thickness of thinnest part | μm | 620 | 610 | 600 | 590 | 590 |
| | Drop height for brakage | m | | | 6.9 | | |
| Example 2-6 | Appearance of container | *1) | A A A | A A A | A A A | A A A | A A B |
| | Thickness of thinnest part | μm | 700 | 650 | 640 | 635 | 630 |
| | Drop height for brakage | m | | | 7.2 | | |
| Example 2-7 | Appearance of container | *1) | A A A | A A A | A A A | A A A | A A B |
| | Thickness of thinnest part | μm | 710 | 660 | 650 | 640 | 630 |
| | Drop height for brakage | m | | | 7.3 | | |
| Example 2-8 | Appearance of container | *1) | A A A | A A A | A A A | A A A | A A B |
| | Thickness of thinnest part | μm | 680 | 645 | 635 | 630 | 630 |
| | Drop height for brakage | m | | | 7.2 | | |
| Example 2-9 | Appearance of container | *1) | A A A | A A A | A A A | A A A | A A B |
| | Thickness of thinnest part | μm | 690 | 645 | 635 | 630 | 630 |
| | Drop height for brakage | m | | | 7.5 | | |

*1) Marks denote the rating (in four grades) of thermoformability, cracking and wavy pattern, respectively

TABLE 2-3

| | | | Sheet heating temperature(° C.) | | | | |
|---|---|---|---|---|---|---|---|
| | | | 130 | 140 | 150 | 160 | 170 |
| Example 2-10 | Appearance of container | *1) | C C C | B B C | A A A | A A A | A A B |
| | Thickness of thinnest part | μm | 680 | 645 | 635 | 625 | 625 |
| | Drop height for brakage | m | | | 7.2 | | |
| Example 2-11 | Appearance of container | *1) | C C C | B B C | A A A | A A A | A A B |
| | Thickness of thinnest part | μm | 680 | 645 | 635 | 630 | 625 |
| | Drop height for brakage | m | | | 7.1 | | |
| Example 2-12 | Appearance of container | *1) | C C C | B C B | A B A | A A B | A A C |
| | Thickness of thinnest part | μm | 670 | 650 | 620 | 600 | 600 |
| | Drop height for brakage | m | | | 7 | | |
| Comparative Example 2-3 | Appearance of container | *1) | D D D | C D D | B C D | A B C | A B D |
| | Thickness of thinnest part | μm | 610 | 570 | 560 | 550 | 550 |
| | Drop height for brakage | m | | | 6.3 | | |
| Comparative Example 2-4 | Appearance of container | *1) | D D D | C D D | B C D | A B C | A B D |
| | Thickness of thinnest part | μm | 620 | 580 | 570 | 565 | 570 |
| | Drop height for brakage | m | | | 6.4 | | |
| Comparative Example 2-5 | Appearance of container | *1) | D D D | C D D | B C D | A B C | A B D |
| | Thickness of thinnest part | μm | 620 | 590 | 580 | 575 | 570 |
| | Drop height for brakage | m | | | 6.4 | | |
| Comparative Example 2-6 | Appearance of container | *1) | D D D | C D D | B C D | A B C | A B D |
| | Thickness of thinnest part | μm | 570 | 570 | 550 | 530 | 530 |
| | Drop height for brakage | m | | | 6.1 | | |
| Comparative Example 2-7 | Appearance of container | *1) | D D D | C D D | B C D | A B C | A B D |
| | Thickness of thinnest part | μm | 640 | 610 | 590 | 590 | 580 |
| | Drop height for brakage | m | | | 6.5 | | |
| Example 2-13 | Appearance of container | *1) | C C C | B B C | A A B | A A A | A A B |
| | Thickness of thinnest part | μm | 670 | 640 | 620 | 610 | 610 |
| | Drop height for brakage | m | | | 6.9 | | |
| Example 2-14 | Appearance of container | *1) | C C C | B B C | A A B | A A A | A A B |
| | Thickness of thinnest part | μm | 670 | 640 | 620 | 610 | 610 |
| | Drop height for brakage | m | | | 6.9 | | |
| Example 2-15 | Appearance of container | *1) | C C C | B B C | A A B | A A A | A A B |
| | Thickness of thinnest part | μm | 670 | 640 | 620 | 610 | 610 |
| | Drop height for brakage | m | | | 6.8 | | |
| Example 2-16 | Appearance of container | *1) | C C C | B B C | A A B | A A A | A A B |
| | Thickness of thinnest part | μm | 670 | 640 | 620 | 610 | 610 |
| | Drop height for brakage | m | | | 6.8 | | |
| Example 2-17 | Appearance of container | *1) | C C C | C C C | B C B | A C C | A B B |
| | Thickness of thinnest part | μm | 620 | 610 | 600 | 590 | 590 |
| | Drop height for brakage | m | | | 6.3 | | |
| Example 2-18 | Appearance of container | *1) | C C C | C C C | B C B | A C B | A B B |
| | Thickness of thinnest part | μm | 625 | 615 | 610 | 590 | 580 |
| | Drop height for brakage | m | | | 6.3 | | |

*1) Marks denote the rating (in four grades) of thermoformability, cracking and wavy pattern, respectively

TABLE 3-1

| | EVOH | | | Resin incorporated | | | | Particle diameter | Oxygen | |
|---|---|---|---|---|---|---|---|---|---|---|
| | Ethylene Content mol % | MI(A) g/10 min | Amount wt % | Kind of Resin | MI(B) g/10 min | Amount wt % | MI(A)/ MI(B) | of cross section μm | Permeability *1) | Re-marks |
| Example 3-1 | 32 | 3.1 | 90 | EMAA (MAA 9 wt %) | 5.7 | 10 | 0.54 | 0.54 | 2.7 | |
| Comparative Example 3-1 | 32 | 3.1 | 100 | — | — | 0 | — | — | 2.3 | |
| Example 3-2 | 32 | 3.1 | 95 | EMAA (MAA 9 wt %) | 5.7 | 5 | 0.54 | 0.58 | 2.7 | |
| Example 3-3 | 32 | 3.1 | 80 | EMAA (MAA 9 wt %) | 5.7 | 20 | 0.54 | 0.54 | 6.0 | |
| Comparative Example 3-2 | 32 | 3.1 | 50 | EMAA (MAA 9 wt %) | 5.7 | 50 | 0.54 | 0.53 | 11.1 | |
| Example 3-4 | 27 | 3.9 | 90 | EMAA (MAA 9 wt %) | 5.7 | 10 | 0.68 | 0.51 | 3.2 | |
| Example 3-5 | 44 | 3.5 | 90 | EMAA (MAA 9 wt %) | 5.7 | 10 | 0.61 | 0.61 | 5.1 | |
| Example 3-6 | 33 | 3.8 | 90 | EMAA (MAA 9 wt %) | 5.7 | 10 | 0.66 | 0.48 | 2.9 | *2) |
| Example 3-7 | 39 | 4.4 | 90 | EMAA (MAA 9 wt %) | 5.7 | 10 | 0.77 | 0.47 | 3.9 | *3) |
| Example 3-8 | 38 | 3.8 | 90 | EMAA (MAA 9 wt %) | 5.7 | 10 | 0.66 | 0.49 | 3.8 | *4) |
| Example 3-9 | 40 | 8.4 | 90 | EMAA (MAA 9 wt %) | 5.7 | 10 | 1.47 | 0.51 | 4.1 | *5) |
| Example 3-10 | 32 | 3.1 | 90 | EMAA (MAA 4 wt %) | 12.2 | 10 | 0.25 | 0.56 | 2.7 | |
| Example 3-11 | 32 | 3.1 | 90 | EMAA (MAA 12 wt %) | 13.4 | 10 | 0.23 | 0.66 | 2.5 | |
| Example 3-12 | 32 | 3.1 | 90 | EAA (AA 9 wt %) | 8.7 | 10 | 0.36 | 1.43 | 2.6 | |

TABLE 3-1-continued

| | EVOH | | | Resin incorporated | | | MI(A)/ MI(B) | Particle diameter of cross section μm | Oxygen Permeability *1) | Re- marks |
|---|---|---|---|---|---|---|---|---|---|---|
| | Ethylene Content mol % | MI(A) g/10 min | Amount wt % | Kind of Resin | MI(B) g/10 min | Amount wt % | | | | |
| Comparative Example 3-3 | 32 | 3.1 | 90 | EMMA (MMA 18 wt %) | 12.1 | 10 | 0.26 | 1.48 | 14.7 | |
| Comparative Example 3-4 | 32 | 3.1 | 90 | Maleic anhydride-PE | 3.6 | 10 | 0.86 | 1.49 | 14.1 | |
| Comparative Example 3-5 | 32 | 3.1 | 90 | Ionomer | 7.6 | 10 | 0.41 | 0.27 | 10.7 | |
| Comparative Example 3-6 | 32 | 3.1 | 90 | LDPE | 3.4 | 10 | 0.91 | 1.22 | 19.1 | |
| Comparative Example 3-7 | 32 | 3.1 | 90 | PA | 7.2 | 10 | 0.43 | 1.31 | 3.3 | |
| Example 3-13 | 32 | 1.2 | 90 | EMAA (MAA 9 wt %) | 15.3 | 10 | 0.078 | 1.23 | 5.7 | |
| Example 3-14 | 32 | 33 | 90 | EMAA (MAA 9 wt %) | 5.7 | 10 | 5.79 | 1.26 | 5.4 | |
| Example 3-15 | 32 | 1.2 | 90 | EAA (AA 9 wt %) | 18 | 10 | 0.067 | 1.25 | 5.5 | |
| Example 3-16 | 32 | 33 | 90 | EAA (AA 9 wt %) | 5.6 | 10 | 5.89 | 0.84 | 5.8 | |
| Example 3-17 | 32 | 3.1 | 90 | EMAA (MAA 9 wt %) | 5.7 | 10 | 0.54 | 0.73 | 7.7 | *6) |
| Example 3-18 | 32 | 3.1 | 90 | EMAA (MAA 9 wt %) | 5.7 | 10 | 0.54 | 0.71 | 5.7 | *7) |

*1) ml/m$^2$ · day · atm
*2) 85 wt % of EVOH (Ethylene content 32 mol %, MI 3.1 g/10 min) and 5 wt % of EVOH (Ethylene content 51 mol %, MI 15.1 g/10 min)
*3) 85 wt % of EVOH (Ethylene content 38 mol %, MI 3.8 g/10 min) and 5 wt % of EVOH (Ethylene content 51 mol %, MI 15.1 g/10 min)
*4) 85 wt % of EVOH (Ethylene content 38 mol %, MI 3.8 g/10 min) and 5 wt % of EVOH (Ethylene content 44 mol %, MI 3.5 g/10 min)
*5) 50 wt % of EVOH (Ethylene content 32 mol %, MI 3.1 g/10 min) and 40 wt % of EVOH (Ethylene content 51 mol %, MI 15.1 g/10 min)
*6) Full-flighted single-screw extruder was used
*7) Extruder with a screw equipped with a mixing part at its forward end was used

TABLE 3-2

| | | | Sheet heating temperature(° C.) | | | | |
|---|---|---|---|---|---|---|---|
| | | | 130 | 140 | 150 | 160 | 170 |
| Example 3-1 | Appearance of container | *1) | C B B | B B A | A A A | A A A | A A A |
| | Thickness of thinnest part | μm | 740 | 720 | 715 | 710 | 710 |
| | Drop height for brakage | m | | | 7.2 | | |
| Comparative Example 3-1 | Appearance of container | *1) | D D D | D D D | C D C | C C C | B C C |
| | Thickness of thinnest part | μm | 680 | 670 | 660 | 655 | 655 |
| | Drop height for brakage | m | | | 4.9 | | |
| Example 3-2 | Appearance of container | *1) | C C B | C C B | B B A | A A A | A A A |
| | Thickness of thinnest part | μm | 730 | 715 | 705 | 700 | 700 |
| | Drop height for brakage | m | | | 7.5 | | |
| Example 3-3 | Appearance of container | *1) | B B B | A A A | A A A | A A A | A A A |
| | Thickness of thinnest part | μm | 750 | 750 | 735 | 730 | 720 |
| | Drop height for brakage | m | | | 7.7 | | |
| Comparative Example 3-2 | Appearance of container | *1) | D B D | C B D | B A C | B A B | B A B |
| | Thickness of thinnest part | μm | 690 | 680 | 680 | 660 | 650 |
| | Drop height for brakage | m | | | 8.1 | | |
| Example 3-4 | Appearance of container | *1) | C C C | C B B | B B A | A A A | A A A |
| | Thickness of thinnest part | μm | 740 | 730 | 710 | 710 | 715 |
| | Drop height for brakage | m | | | 6.9 | | |
| Example 3-5 | Appearance of container | *1) | B B C | B B B | A A A | A A A | A A A |
| | Thickness of thinnest part | μm | 740 | 730 | 720 | 715 | 715 |
| | Drop height for brakage | m | | | 7.5 | | |
| Example 3-6 | Appearance of container | *1) | B A A | A A A | A A A | A A A | A A A |
| | Thickness of thinnest part | μm | 750 | 740 | 730 | 720 | 720 |
| | Drop height for brakage | m | | | 7.6 | | |
| Example 3-7 | Appearance of container | *1) | B A A | A A A | A A A | A A A | A A A |
| | Thickness of thinnest part | μm | 750 | 730 | 730 | 720 | 705 |
| | height for brakage | m | | | 7.5 | | |
| Example 3-8 | Appearance of container | *1) | B A B | A A A | A A A | A A A | A A A |
| | Thickness of thinnest part | μm | 740 | 730 | 720 | 710 | 710 |
| | Drop height for brakage | m | | | 7.8 | | |
| Example 3-9 | Appearance of container | *1) | B B B | A A A | A A A | A A A | A A A |
| | Thickness of thinnest part | μm | 740 | 720 | 710 | 700 | 700 |
| | Drop height for brakage | m | | | 7.9 | | |

*1) Marks denote the rating (in four grades) of thermoformability, cracking and wavy pattern, respectively

TABLE 3-3

| | | | \*1)/μm/m | Sheet heating temperature(° C.) | | | | |
|---|---|---|---|---|---|---|---|---|
| | | | | 130 | 140 | 150 | 160 | 170 |
| Example 3-10 | Appearance of container | \*1) | | C B B | B B A | B B A | A A A | A A A |
| | Thickness of thinnest part | μm | | 730 | 720 | 705 | 705 | 700 |
| | Drop height for brakage | m | | | | 7.4 | | |
| Example 3-11 | Appearance of container | \*1) | | C B B | B B A | B B A | A A A | A A A |
| | Thickness of thinnest part | μm | | 730 | 720 | 710 | 705 | 705 |
| | Drop height for brakage | m | | | | 7.3 | | |
| Example 3-12 | Appearance of container | \*1) | | C B B | B B B | B B B | B B A | A A A |
| | Thickness of thinnest part | μm | | 725 | 715 | 700 | 700 | 695 |
| | Drop height for brakage | m | | | | 7.1 | | |
| Comparative Example 3-3 | Appearance of container | \*1) | | D D D | D C C | C C C | B C C | B C C |
| | Thickness of thinnest part | μm | | 680 | 670 | 650 | 640 | 635 |
| | Drop height for brakage | m | | | | 6.7 | | |
| Comparative Example 3-4 | Appearance of container | \*1) | | D D D | D C C | C C C | B C C | B C C |
| | Thickness of thinnest part | μm | | 630 | 620 | 620 | 610 | 610 |
| | Drop height for brakage | m | | | | 6.5 | | |
| Comparative Example 3-5 | Appearance of container | \*1) | | D D D | D C C | C C C | B C C | B B B |
| | Thickness of thinnest part | μm | | 690 | 680 | 660 | 650 | 640 |
| | Drop height for brakage | m | | | | 6.4 | | |
| Comparative Example 3-6 | Appearance of container | \*1) | | D D D | D D D | C D D | B D D | B D D |
| | Thickness of thinnest part | μm | | 680 | 670 | 660 | 645 | 630 |
| | Drop height for brakage | m | | | | 5.9 | | |
| Comparative Example 3-7 | Appearance of container | \*1) | | D D D | D C C | C G C | C C C | B C C |
| | Thickness of thinnest part | μm | | 670 | 670 | 660 | 650 | 640 |
| | Drop height for brakage | m | | | | 6.5 | | |
| Example 3-13 | Appearance of container | \*1) | | C C C | C C C | B C C | B C C | B B B |
| | Thickness of thinnest part | μm | | 670 | 660 | 650 | 645 | 640 |
| | Drop height for brakage | m | | | | 6.9 | | |
| Example 3-14 | Appearance of container | \*1) | | C C C | C C C | C C C | B C B | B C B |
| | Thickness of thinnest part | μm | | 670 | 665 | 650 | 640 | 635 |
| | Drop height for brakage | m | | | | 7.1 | | |
| Example 3-15 | Appearance of container | \*1) | | D C C | C C C | C C C | B C C | B C C |
| | Thickness of thinnest part | μm | | 650 | 640 | 630 | 620 | 620 |
| | Drop height for brakage | m | | | | 7.1 | | |
| Example 3-16 | Appearance of container | \*1) | | D C C | C C C | C C C | B C C | B C C |
| | Thickness of thinnest part | μm | | 650 | 640 | 620 | 620 | 610 |
| | Drop height for brakage | m | | | | 6.9 | | |
| Example 3-17 | Appearance of container | \*1) | | D D D | D D D | C C C | B C C | B C C |
| | Thickness of thinnest part | μm | | 630 | 630 | 620 | 620 | 610 |
| | Drop height for brakage | m | | | | 6.5 | | |
| Example 3-18 | Appearance of container | \*1) | | D D D | C D D | C C D | B C C | B C C |
| | Thickness of thinnest part | μm | | 640 | 640 | 635 | 630 | 625 |
| | Drop height for brakage | m | | | | 6.4 | | |

\*1) Marks denote the rating (in four grades) of thermoformability, cracking and wavy pattern, respectively

TABLE 4-1

| | Inner and outer layers | | | Particle diameter | | Oxygen |
|---|---|---|---|---|---|---|
| | Kind of resin | Vicat softening point ° C. | Intermediate layer | in cross section μm | Haze % | permeability \*1) |
| Example 4-1 | PP (block copolymer) | 150 | EVOH + EMAA | 0.54 | 36 | 2.6 |
| Example 4-2 | PP (random copolymer) + PP | 141 | EVOH + EMAA | 0.55 | 31 | 2.3 |
| Example 4-3 | PS | — | EVOH + EMAA | 0.54 | — | 2.7 |
| Example 4-4 | PP | 155 | EVOH + EMAA | 0.54 | 73 | 2.7 |
| Example 4-5 | PP (block copolymer) | 150 | EVOH(two kinds) + EMAA | 0.49 | 35 | 2.9 |
| Example 4-6 | PP (random copolymer) + PP | 141 | EVOH(two kinds) + EMAA | 0.47 | 30 | 3.9 |
| Example 4-7 | PS | — | EVOH(two kinds) + EMAA | 0.48 | — | 3.9 |
| Example 4-8 | PP | 155 | EVOH(two kinds) + EMAA | 0.51 | 75 | 4.1 |
| Comparative Example 4-1 | PP (block copolymer) | 150 | EVOH alone | — | 35 | 4.7 |
| Comparative Example 4-2 | PP (random copolymer) + PP | 141 | EVOH alone | — | 28 | 6.6 |
| Comparative Example 4-3 | PS | — | EVOH alone | — | — | 5.8 |
| Comparative Example 4-4 | PP | 155 | EVOH alone | — | 69 | 5.6 |

TABLE 4-1-continued

| | Inner and outer layers | | | Particle diameter | | Oxygen |
| --- | --- | --- | --- | --- | --- | --- |
| | Kind of resin | Vicat softening point ° C. | Intermediate layer | in cross section μm | Haze % | permeability *1) |
| Example 4-9 | *2) | — | EVOH + EMAA | 0.57 | 27 | 2.5 |
| Example 4-10 | *3) | — | EVOH + EMAA | 0.56 | — | 2.7 |

*1) ml/m² · day · atm
*2) Inner layer: PP(random copolymer) Outer layer: recycled resin composition
*3) Inner layer: HIPS Outer layer: recycled resin composition

TABLE 4-2

| | | | Sheet heating temperature(° C.) | | | | |
| --- | --- | --- | --- | --- | --- | --- | --- |
| | | | 130 | 140 | 150 | 160 | 170 |
| Example 4-1 | Appearance of container | *1) | B B B | B B B | A A A | A A A | A A B |
| | Thickness of thinnest part | μm | 660 | 640 | 630 | 615 | 610 |
| | Drop height for brakage | m | | | 7.6 | | |
| Example 4-2 | Appearance of container | *1) | B B B | B B B | A A A | A A A | A A B |
| | Thickness of thinnest part | μm | 670 | 640 | 630 | 610 | 610 |
| | Drop height for brakage | m | | | 7.2 | | |
| Example 4-3 | Appearance of container | *1) | C B B | B B A | A A A | A A A | A A A |
| | Thickness of thinnest part | μm | 720 | 710 | 705 | 705 | 700 |
| | Drop height for brakage | m | | | 5.5 | | |
| Example 4-4 | Appearance of container | *1) | C C C | B B B | A A A | A A A | A A A |
| | Thickness of thinnest part | μm | 680 | 645 | 630 | 625 | 625 |
| | Drop height for brakage | m | | | 5.7 | | |
| Example 4-5 | Appearance of container | *1) | B B B | B A A | A A A | A A A | A A A |
| | Thickness of thinnest part | μm | 670 | 660 | 660 | 650 | 640 |
| | Drop height for brakage | m | | | 7.8 | | |
| Example 4-6 | Appearance of container | *1) | B B B | B A A | A A A | A A A | A A A |
| | Thickness of thinnest part | μm | 680 | 660 | 650 | 640 | 630 |
| | Drop height for brakage | m | | | 7.6 | | |
| Example 4-7 | Appearance of container | *1) | C B B | B A B | A A A | A A A | A A A |
| | Thickness of thinnest part | μm | 730 | 730 | 720 | 715 | 710 |
| | Drop height for brakage | m | | | 5.9 | | |
| Example 4-8 | Appearance of container | *1) | C B C | B A B | A A A | A A A | A A A |
| | Thickness of thinnest part | μm | 680 | 660 | 660 | 650 | 640 |
| | Drop height for brakage | m | | | 5.9 | | |
| Comparative Example 4-1 | Appearance of container | *1) | D D D | D D D | C C C | B C C | B C D |
| | Thickness of thinnest part | μm | 580 | 580 | 530 | 520 | 510 |
| | Drop height for brakage | m | | | 5.5 | | |
| Comparative Example 4-2 | Appearance of container | *1) | D D D | D D D | C C C | B C C | B C D |
| | Thickness of thinnest part | μm | 590 | 570 | 530 | 530 | 520 |
| | Drop height for brakage | m | | | 5.2 | | |
| Comparative Example 4-3 | Appearance of container | *1) | D D D | D D D | C D C | C C C | B C C |
| | Thickness of thinnest part | μm | 630 | 620 | 620 | 610 | 610 |
| | Drop height for brakage | m | | | 4.6 | | |
| Comparative Example 4-4 | Appearance of container | *1) | D D D | C D D | B C C | A C C | A C D |
| | Thickness of thinnest part | μm | 640 | 610 | 520 | 520 | 520 |
| | Drop height for brakage | m | | | 4.8 | | |
| Example 4-9 | Appearance of container | *1) | B B B | B B B | A A A | A A A | A A B |
| | Thickness of thinnest part | μm | 670 | 640 | 630 | 610 | 610 |
| | Drop height for brakage | m | | | 7.2 | | |
| Example 4-10 | Appearance of container | *1) | C B B | B B A | A B A | A B A | A A A |
| | Thickness of thinnest part | μm | 710 | 705 | 705 | 700 | 695 |
| | Drop height for brakage | m | | | 5.3 | | |

*1) Marks denote the rating (in four grades) of thermoformability, cracking and wavy pattern, respectively

What is claimed is:

1. A thermoformable multilayer film with a total thickness of 50–300 μm, comprising a layer of a resin composition with a thickness of 3–50 μm, said resin composition comprising 60–99 wt % of ethylene-vinyl alcohol copolymer and 40–1 wt % of ethylene-(meth)acrylic acid copolymer, said ethylene-(meth)acrylic acid copolymer
consisting essentially of (meth)acrylic acid and ethylene and being dispersed in the form of particles in the matrix of said ethylene-vinyl alcohol copolymer, wherein said ethylene-vinyl alcohol copolymer has an ethylene content of 20–60 mol % and a degree of hydrolysis of not less than 90%, and said ethylene-(meth)acrylic acid copolymer containing 1–30 wt % of (meth)acrylic acid.

2. A thermoformable multilayer film as defined in claim 1, wherein the ethylene-vinyl alcohol copolymer comprises two kinds of ethylene-vinyl alcohol copolymers (a) and (b) in a ratio (a)/(b) of from 2/1 to 50/1 by weight, wherein an ethylene content of (a) is 20–45 mol % and an ethylene content of (b) is 45–65 mol %, with the difference between their ethylene contents being not less than 8 mol %.

3. A thermoformable multilayer film as defined in claim 1, wherein an ethylene-vinyl alcohol copolymer has a value (A) of melt index and an ethylene-(meth)acrylic acid copolymer has a value (B) of melt index, with the ratio (A)/(B) being 0.1–5.0.

4. A thermoformable multilayer film as defined in claim 1, wherein the ethylene-(meth)acrylic acid copolymer is dispersed in the form of particles in the ethylene-vinyl alcohol copolymer matrix, said particles being cylindrically elongated in one direction parallel to the film surface, with their cross-section perpendicular to that direction having an average diameter of 0.2–1.3 μm.

5. A thermoformable multilayer film as defined in claim 1, which comprises a heat-sealing layer.

6. A thermoformable multilayer film as defined in claim 1, which comprises a polypropylene resin layer and/or polyamide resin layer, in addition to a heat-sealing layer.

7. A thermoformable multilayer film as defined in claim 1, which has a haze of not more than 10%.

8. A thermoformed container made from the multilayer film defined in claim 1.

9. A thermoformed container as defined in claim 8, which satisfies following equations, $$5S \leq T/t \leq 30S \tag{1}$$

$$50 \leq T \leq 300 \tag{2}$$

$$t \geq 20 \tag{3}$$

where T stands for the total wall thickness (in μm) of the thickest part of the container, t stands for the total wall thickness (in μm) of the thinnest part of the container, and S stands for the draw ratio of the container which is defined as the ratio of the depth of the container to the diameter of a circle inscribed in the opening of the container.

10. A thermoformed container as defined in claim 8, wherein the ethylene-(meth)acrylic acid copolymer is dispersed in the form of particles in the ethylene-vinyl alcohol copolymer matrix in the thinnest part of the container wall, said particles being elongated flat in two directions parallel to the film surface, with their cross-section perpendicular to the film surface having an average thickness of 0.05–1.0 μm.

11. A thermoformable multilayer structure comprising a layer of a resin composition comprising 60–99 wt % of ethylene-vinyl alcohol copolymer and 40–1 wt % of ethylene-(meth)acrylic acid copolymer, said ethylene-(meth)acrylic acid copolymer consisting essentially of (meth)acrylic acid and ethylene and being dispersed in the form of particles in the matrix of said ethylene-vinyl alcohol copolymer, wherein said ethylene-vinyl alcohol copolymer has an ethylene content of 20–60 mol % and a degree of hydrolysis of not less than 90%, and said ethylene-(meth)acrylic acid copolymer containing 1–30 wt % of (meth)acrylic acid.

12. A thermoformable multilayer structure as defined in claim 11, wherein the ethylene-vinyl alcohol copolymer comprises two kinds of ethylene-vinyl alcohol copolymers (a) and (b) in a ratio (a/b) of from 2/1 to 50/1 by weight, wherein an ethylene content of (a) is 20–45 mol % and an ethylene content of (b) is 45–65 mol %, with the difference between their ethylene contents being not less than 8 mol %.

13. A thermoformable multilayer structure as defined in claim 11, wherein the ethylene-(meth)acrylic acid copolymer is dispersed in the form of particles in the ethylene-vinyl alcohol copolymer matrix, said particles being cylindrically elongated in one direction parallel to the surface of the multilayer structure, with their cross-section perpendicular to that direction having an average diameter of 0.2–1.3 μm.

14. A thermoformable multilayer structure as defined in claim 11, which comprises a layer of propylene copolymer having a Vicat softening point of 100–152° C.

15. A thermoformable multilayer structure as defined in claim 14, wherein the propylene copolymer is a random copolymer.

16. A thermoformable multilayer structure as defined in claim 14, wherein the propylene copolymer is a block copolymer.

17. A thermoformable multilayer structure as defined in claim 11, which comprises a layer of polystyrene.

18. A thermoformable multilayer structure as defined in claim 11, which has a haze lower than 50%.

19. A thermoformed container made from the multilayer structure defined in claim 11.

20. A thermoformed container as defined in claim 19, which satisfies following equations, $$S \leq T/t \leq 20S \tag{5}$$

$$300 < T \leq 3000 \tag{6}$$

$$t \geq 100 \tag{7}$$

where T stands for the total wall thickness (in μm) of the thickest part of the container, t stands for the total wall thickness (in μm) of the thinnest part of the container, and S stands for the draw ratio of the container which is defined as the ratio of the depth of the container to the diameter of a circle inscribed in the opening of the container.

21. A resin composition which comprises 60–99 wt % of ethylene-vinyl alcohol copolymer and 40–1 wt % of ethylene-(meth)acrylic acid copolymer, said ethylene-(meth)acrylic acid copolymer consisting essentially of (meth)acrylic acid and ethylene and being dispersed in the form of particles in the matrix of said ethylene-vinyl alcohol copolymer, wherein said ethylene-vinyl alcohol copolymer has an ethylene content of 20–60 mol % and a degree of hydrolysis of not less than 90%, and said ethylene-(meth) acrylic acid copolymer containing 1–30 wt % of (meth) acrylic acid.

22. A resin composition as defined in claim 21, wherein the ethylene-vinyl alcohol copolymer comprises two kinds of ethylene-vinyl alcohol copolymers (a) and (b) in a ratio (a/b) of from 2/1 to 50/1 by weight, wherein an ethylene content of (a) is 20–45 mol % and an ethylene content of (b) is 45–65 mol %, with the difference between their ethylene contents being not less than 8 mol %.

23. A resin composition as defined in claim 21, wherein the ethylene-(meth)acrylic acid copolymer is dispersed in the form of particles in the ethylene-vinyl alcohol copolymer matrix, with the particles having an average particle diameter of 0.3–1.5 μm.

24. A thermoformable resin composition which is a resin composition defined in claim 21.

25. A thermoformable multilayer film with a total thickness of 50–300 μm, comprising a layer of a resin composition with a thickness of 3–50 μm, said resin composition comprising 60–99 wt.% of ethylene-vinyl alcohol copolymer and 40–1 wt % of ethylene(meth)acrylic acid copolymer, said ethylene-(meth)acrylic acid copolymer consisting of (meth)acrylic acid and ethylene and being dispersed in the form of particles in the matrix of said ethylene-vinyl alcohol copolymer, wherein said ethylene-vinyl alcohol copolymer has an ethylene content of 20–60 mol % and a degree of hydrolysis of not less than 90%, and said ethylene-(meth)acrylic acid copolymer containing 1–30 wt % of (meth)acrylic acid.

26. A thermoformable multilayer film as defined in claim 25, wherein the ethylene-vinyl alcohol copolymer comprises two kinds of ethylene-vinyl alcohol copolymers (a) and (b) in a ratio (a)/(b) of from 2/1 to 50/1 by weight, wherein an ethylene content of (a) is 20–45 mol % and an ethylene content of (b) is 45–65 mol %, with the difference between their ethylene contents being not less than 8 mol %.

27. A thermoformable multilayer film as defined in claim 25, wherein an ethylene-vinyl alcohol copolymer has a value (A) of melt index and an ethylene-(meth)acrylic acid copolymer has a value (B) of melt index, with the ratio (A)/(B) being 0.1–5.0.

28. A thermoformable multilayer film as defined in claim 25, wherein the ethylene-(meth)acrylic acid copolymer is dispersed in the form of particles in the ethylene-vinyl alcohol copolymer matrix, said particles being cylindrically elongated in one direction parallel to the film surface, with their cross-section perpendicular to that direction having an average diameter of 0.2–1.3 μm.

29. A thermoformable multilayer film as defined in claim 25, which comprises a heat-sealing layer.

30. A thermoformable multilayer film as defined in claim 25, which comprises a polypropylene resin layer and/or polyamide resin layer, in addition to a heat-sealing layer.

31. A thermoformable multilayer film as defined in claim 25, which has a haze of not more than 10%.

32. A thermoformed container made from the multilayer film defined in claim 25.

33. A thermoformed container as defined in claim 32, which satisfies following equations, $$5S \leq T/t \leq 30S \quad (1)$$

$$50 \leq T \leq 300 \quad (2)$$

$$t \geq 20 \quad (3)$$

where T stands for the total wall thickness (in μm) of the thickest part of the container, t stands for the total wall thickness (in μm) of the thinnest part of the container, and S stands for the draw ratio of the container which is defined as the ratio of the depth of the container to the diameter of a circle inscribed in the opening of the container.

34. A thermoformed container as defined in claim 32, wherein the ethylene-(meth) acrylic acid copolymer is dispersed in the form of particles in the ethylene-vinyl alcohol copolymer matrix in the thinnest part of the container wall, said particles being elongated flat in two directions parallel to the film surface, with their cross-section perpendicular to the film surface having an average thickness of 0.05–1.0 μm.

35. A thermoformable multilayer structure comprising a layer of a resin composition-comprising 60–99 wt % of ethylene-vinyl alcohol copolymer and 40–1 wt % of ethylene-(meth)acrylic acid copolymer, said ethylene-(meth)acrylic acid copolymer consisting of (meth)acrylic acid and ethylene and being dispersed in the form of particles in the matrix of said ethylene-vinyl alcohol copolymer, wherein said ethylene-vinyl alcohol copolymer has an ethylene content of 20–60 mol % and a degree of hydrolysis of not less than 90%, and said ethylene(meth) acrylic acid copolymer containing 1–30 wt % of (meth) acrylic acid.

36. A thermoformable multilayer structure as defined in claim 35, wherein the ethylene-vinyl alcohol copolymer comprises two kinds of ethylene-vinyl alcohol copolymers (a) and (b) in a ratio (a/b) of from 2/1 to 50/1 by weight. Wherein an ethylene content of (a) is 20–45 mol. % and an ethylene content of (b) is 45–65 mol %, with the difference between their ethylene contents being not less than 8 mol %.

37. A thermoformable multilayer structure as defined in claim 35, wherein the ethylene-(meth)acrylic acid copolymer is dispersed in the form of particles in the ethylene-vinyl alcohol copolymer matrix, said particles being cylindrically elongated in one direction parallel to the surface of the multilayer structure, with their cross-section perpendicular to that direction having an average diameter of 0.2–1.3 μm.

38. A thermoformable multilayer structure as defined in claim 35, which comprises a layer of propylene copolymer having a Vicat softening point of 100–152° C.

39. A thermoformable multilayer structure as defined in claim 38, wherein the propylene copolymer is a random copolymer.

40. A thermoformable multilayer structure as defined in claim 38, wherein the propylene copolymer is a block copolymer.

41. A thermoformable multilayer structure as defined in claim 35, which comprises a layer of polystyrene.

42. A thermoformable multilayer structure as defined in claim 35, which has a haze lower than 50%.

43. A thermoformed container made from the multilayer structure defined in claim 35.

44. A thermoformed container as defined in claim 43, which satisfies following equations, $$S \leq T/t \leq 20S \quad (5)$$

$$300 < T \leq 3000 \quad (6)$$

$$t \geq 100 \quad (7)$$

where T stands for the total wall thickness (in μm) of the thickest part of the container, t stands for the total wall thickness (in μm) of the thinnest part of the container, and S stands for the draw ratio of the container which is defined as the ratio of the depth of the container to the diameter of a circle inscribed in the opening of the container.

45. A resin composition which comprises 60–99 wt % of ethylene-vinyl alcohol copolymer and 40–1 wt % of ethylene(meth)acrylic acid copolymer, said ethylene-(meth) acrylic acid copolymer consisting of (meth)acrylic acid and ethylene and being dispersed in the form of particles in the matrix of said ethylene-vinyl alcohol copolymer, wherein said ethylene-vinyl alcohol copolymer has an ethylene content of 20–60 mol % and a degree of hydrolysis of not less than than 90%, and said ethylene-(meth)acrylic acid copolymer containing 1–30 wt % of (meth)acrylic acid.

46. A resin composition as defined in claim 45, wherein the ethylene-vinyl alcohol copolymer comprises two kinds of ethylene-vinyl alcohol copolymers (a) and (b) in a ratio (a/b) of from 2/1 to 50/1 by weight, wherein an ethylene content of (a) is 20–45 mol % and an ethylene content of (b) is 45–65 mol %, with the difference between their ethylene contents being not less than 8 mol %.

47. A resin composition as defined in claim 45, wherein the ethylene-(meth) acrylic acid copolymer is dispersed in the form of particles in the ethylene-vinyl alcohol copolymer matrix, with the particles having an average particle diameter of 0.3–1.5 μm.

* * * * *

UNITED STATES PATENT AND TRADEMARK OFFICE
CERTIFICATE OF CORRECTION

PATENT NO. : 5,972,447

DATED : October 26, 1999

INVENTOR(S): Nobuhiro HATA, et al.

It is certified that an error appears in the above-identified patent and that said Letters Patent is hereby corrected as shown below:

On the Title page, Item [ 75 ], the 1st Inventor's name is listed incorrectly. Item [ 75 ] should read as follows:

--- [75] Inventors: Nobuhiro Hata; Hiroyuki Shimo,
both of Kurashiki, Japan ---

Signed and Sealed this

Twenty-second Day of May, 2001

Attest:

NICHOLAS P. GODICI

Attesting Officer     Acting Director of the United States Patent and Trademark Office